US011736180B2

(12) United States Patent
Raghavan et al.

(10) Patent No.: US 11,736,180 B2
(45) Date of Patent: Aug. 22, 2023

(54) MILLIMETER-WAVE MULTI-BEAMS

(71) Applicant: QUALCOMM Incorporated, San Diego, CA (US)

(72) Inventors: Vasanthan Raghavan, West Windsor Township, NJ (US); Raghu Narayan Challa, San Diego, CA (US); Ruhua He, San Diego, CA (US); Mihir Vijay Laghate, San Diego, CA (US); Juergen Cezanne, Ocean Township, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/141,516

(22) Filed: Jan. 5, 2021

(65) Prior Publication Data
US 2021/0218461 A1 Jul. 15, 2021

Related U.S. Application Data

(60) Provisional application No. 62/959,664, filed on Jan. 10, 2020.

(51) Int. Cl.
*H04W 4/00* (2018.01)
*H04B 7/08* (2006.01)
*H04B 7/06* (2006.01)
*H04L 25/02* (2006.01)
*H04B 17/318* (2015.01)
*H04W 8/24* (2009.01)

(52) U.S. Cl.
CPC ........... *H04B 7/086* (2013.01); *H04B 7/0617* (2013.01); *H04B 7/0626* (2013.01);
(Continued)

(58) Field of Classification Search
CPC ... H04W 28/04; H04W 72/04; H04W 72/042; H04W 88/08; H04W 8/24; H04W 24/08;
(Continued)

(56) References Cited

U.S. PATENT DOCUMENTS 9,762,347 B2 * 9/2017 Shelby ............... H04L 27/2656
10,834,613 B1 * 11/2020 Tsai ..................... H04W 16/28
(Continued)

FOREIGN PATENT DOCUMENTS

CN 109150335 A * 1/2019 ........... H04B 17/318
CN 112671440 A * 4/2021 ............ H04W 16/28
(Continued)

OTHER PUBLICATIONS

International Search Report and Written Opinion—PCT/US2021/012426—ISA/EPO—dated Apr. 9, 2021.

*Primary Examiner* — Phuongchau Ba Nguyen
(74) *Attorney, Agent, or Firm* — Qualcomm Incorporated

(57) ABSTRACT

Aspects of the disclosure relate to devices, systems and methods for multi-beam formation. A user equipment (UE) may determine a sampling interval for references signals to be transmitted by a base station for an upcoming control or data communication. For example, the UE may determine a maximum sampling interval tolerable for channel estimation and select the sampling interval based on the maximum. In some examples, the UE determines the sampling interval based on characteristics of its motion. The UE transmits an indication of the sampling interval to the base station. Based on the indication, the base station selects an interval for the reference signals and transmits the reference signals to the UE to enable it to perform the channel estimation for the multi-beam. The base station may determine to select the interval for the reference signals such that it is less than or equal to the sampling interval indicated by the UE.

25 Claims, 15 Drawing Sheets

(52) U.S. Cl.
CPC ......... *H04B 17/318* (2015.01); *H04L 25/021* (2013.01); *H04W 8/24* (2013.01)

(58) Field of Classification Search
CPC . H04L 5/0007; H04L 25/021; H04L 25/0224; H04B 7/086; H04B 7/0617; H04B 7/0626; H04B 17/318; H04B 7/0408; H04B 7/063
See application file for complete search history.

(56) References Cited

U.S. PATENT DOCUMENTS

| | | | |
|---|---|---|---|
| 2002/0021684 A1* | 2/2002 | Toshimitsu | H04B 7/2615 370/347 |
| 2002/0051430 A1* | 5/2002 | Kasami | H04W 16/28 370/445 |
| 2006/0286955 A1* | 12/2006 | Yoshida | H04B 7/0854 455/140 |
| 2010/0074343 A1* | 3/2010 | Gaal | H04L 5/0048 375/259 |
| 2011/0128909 A1* | 6/2011 | Luo | H04L 5/0023 370/328 |
| 2018/0302141 A1 | 10/2018 | Ku et al. | |
| 2019/0020393 A1* | 1/2019 | Yuan | H04B 7/0617 |

FOREIGN PATENT DOCUMENTS

| | | | | |
|---|---|---|---|---|
| CN | 114598584 A | * | 6/2022 | |
| GB | 2349045 A | * | 10/2000 | H01Q 1/246 |
| WO | 2015109153 A1 | | 7/2015 | |
| WO | WO-2015109153 A1 | * | 7/2015 | H04W 24/10 |

* cited by examiner

MILLIMETER-WAVE MULTI-BEAMS

PRIORITY INFORMATION

The present Application for Patent claims priority under 35 U.S.C. § 119 to U.S. Provisional Patent Application No. 62/959,664 by Raghavan, filed 10 Jan. 2020 and entitled "Millimeter-Wave Multi-Beams," which is assigned to the assignee hereof and hereby expressly incorporated by reference herein.

TECHNICAL FIELD

Aspects of the present disclosure generally relate to wireless communication, and specifically, to techniques and apparatuses for analog beamforming for millimeter-wave multi-beam generation.

BACKGROUND

Wireless communication networks are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless communication network may include numerous network nodes including a core network, base stations in communication with the core network, and mobile devices (each referred to as a user equipment (UE)) served by the base stations. Each base station and UE may be equipped with multiple antennas, which may be used to employ techniques such as transmit diversity, multiple-input multiple-output (MIMO), or beamforming. Beamforming is a technique to form unicast beams between network nodes (for example, between a base station and a UE, between a base station and another base station, or between a UE and another UE) that may improve the performance of a wireless communication link between the two network nodes. Beamforming more specifically refers to signal processing techniques that may be used at a transmitting device or a receiving device to shape or steer a beam of energy along a spatial path between the transmitting device and the receiving device. Beamforming may be achieved by combining or adjusting the signals transmitted via the antenna elements of a multi-antenna array such that signals propagating along particular orientations or directions with respect to the antenna array experience constructive interference while others experience destructive interference.

The adjustment of the signals transmitted via the respective antenna elements may include the application of amplitude and phase offsets to the signals to generate the beam. The amplitude and phase offsets may be determined through performing measurements on reference signals and estimating a channel based on the measurements. When UEs are in motion, the adequacy of the channel estimate may degrade, which may reduce the throughput achievable via the communication link between the devices.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for analog millimeter-wave beamforming at a first wireless communication device. The method includes determining, based on motion of the first wireless communication device, a first sampling interval for a set of sampling instances for a wireless channel estimation operation for a multi-beam having a beam pattern with multiple dominant peaks. The method also includes transmitting, to a second wireless communication device, first control information including an indication of the first sampling interval, an indication of a capability of the first wireless communication device for analog beamforming, and a request for a number of wireless reference signals for the multi-beam.

In some aspects, the method further includes receiving, from the second wireless communication device after the transmission of the first control information, second control information including an indication of a second sampling interval for the set of sampling instances. The method may further include receiving, from the second wireless communication device via a set of antenna elements, a set of wireless reference signals for the channel estimation operation according to the second sampling interval. The method may further include performing one or more measurements on the set of wireless reference signals obtained via one or more respective antenna elements of the set of antenna elements at each of the sampling instances of the set of sampling instances according to the second sampling interval. The method may further include performing the channel estimation operation based on the measurements to obtain a channel estimate for the multi-beam. The method may further include determining a set of beam weights for each of one or more subsets of antenna elements of the set of antenna elements for each of one or more of the wireless reference signals based on the channel estimation operation and the capability for analog beamforming. The method may further include configuring a set of multi-beam weights for the multi-beam based on the determination of the sets of beam weights. The method may further include transmitting control or data information to, or receiving control or data information from, the second wireless communication device via the configured multi-beam at a usage instance based on at least one of a time of the usage instance, a speed or a velocity associated with the first wireless communication device, or the second sampling interval.

Another innovative aspect of the subject matter described in this disclosure can be implemented in a method for analog millimeter-wave beamforming at a first wireless communication device. The method includes receiving, from a second wireless communication device, first control information including an indication of a first sampling interval for a channel estimation operation for a multi-beam having a beam pattern with multiple dominant peaks, an indication of a capability of the second wireless communication device for analog beamforming, and a request for a number of wireless reference signals for use by the second wireless communication device to form the multi-beam. The method also includes transmitting, to the second wireless communication device after the reception of the first control information, second control information including an indication of a second sampling interval for the set of sampling instances. The method additionally includes transmitting, to the second wireless communication device, wireless reference signals according to the second sampling interval.

Another innovative aspect of the subject matter described in this disclosure can be implemented in a wireless communication device configured for analog millimeter-wave beamforming. The device includes at least one modem, at least one processor communicatively coupled with the at least one modem, and at least one memory communicatively coupled with the at least one processor and storing processor-readable code that, when executed by the at least one processor in conjunction with the at least one modem, is configured to perform the any of the methods above.

DETAILED DESCRIPTION

Figure 1:
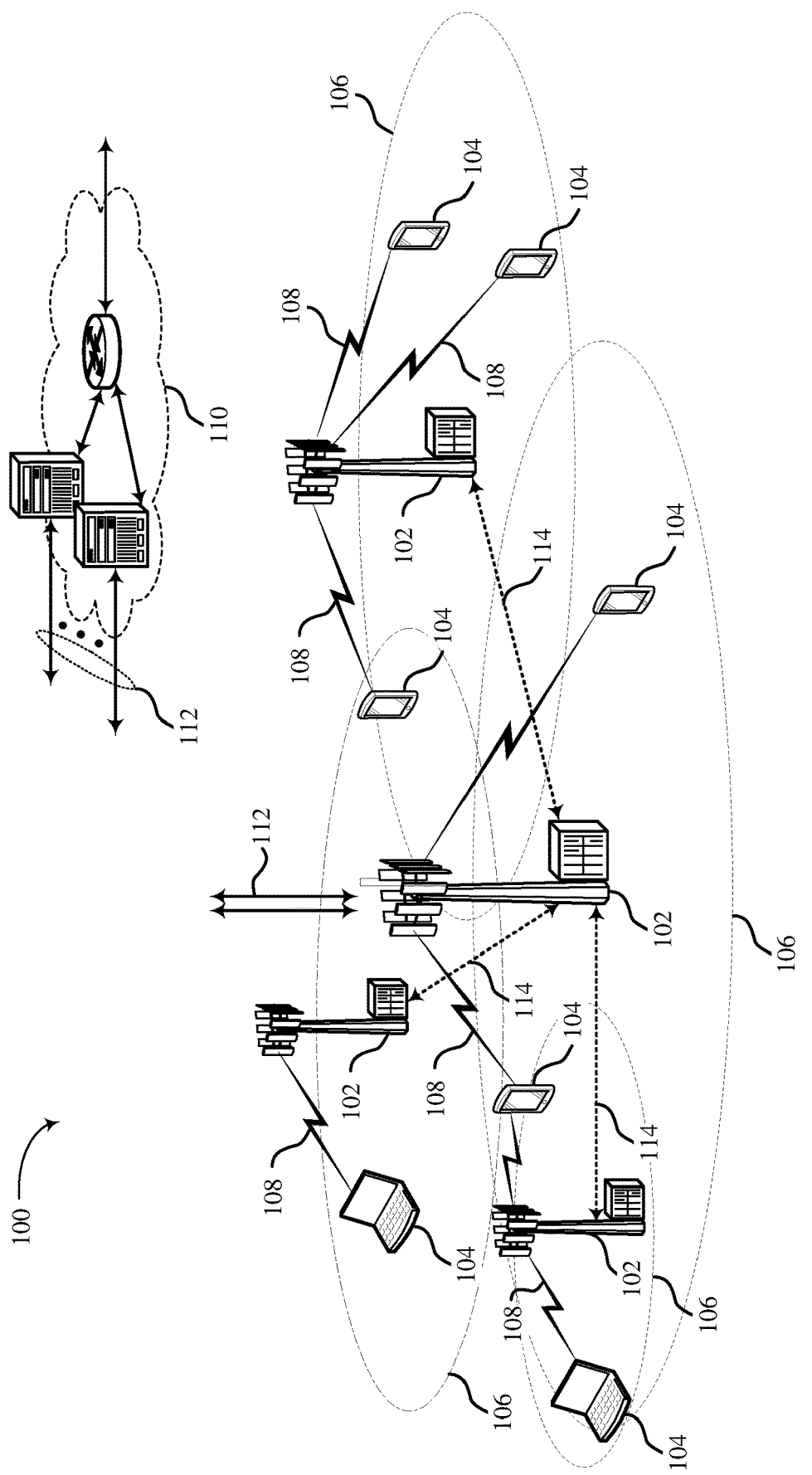
FIG. 1 shows an example wireless communication network that supports multi-beam generation in accordance with aspects of the present disclosure.

Aspects of the present disclosure generally relate to wireless communication, and specifically, to techniques and apparatuses for analog beamforming for millimeter-wave multi-beam generation. In various examples, a UE may determine a sampling interval for a set of wireless references signals yet to be transmitted by a base station for an upcoming control or data communication. For example, the UE may determine a maximum sampling interval tolerable by the UE for channel estimation and select the sampling interval based on the determined maximum. In some examples, the UE determines the sampling interval based on a speed or velocity, a motion state, or a Doppler parameter associated with motion of the UE. In some examples, the UE may additionally determine the sampling interval based on one or more quality of service (QoS) parameters, such as a throughput or latency requirement. A UE may require a sufficiently short sampling interval in order to obtain an accurate channel estimate so that it may then form an accurate multi-beam. The UE may transmit control information to the base station that indicates the selected sampling interval. The control information may also include a request for the reference signals for the channel estimation.

The base station may receive the control information, select an interval for the reference signals, and transmit the reference signals to the UE. Advantageously, the base station may determine to select an interval for the reference signals that is less than or equal to the sampling interval indicated in the control information received from the UE. Upon receiving the reference signals, the UE may perform a channel estimation operation to determine a set of beam weights for forming the multi-beam. The UE may also determine whether the interval associated with the reference signals is less than or equal to the determined sampling interval it earlier indicated to the base station. If so, and if a time of a downlink or uplink grant during which the multi-beam may be used is within a threshold time, the UE may select to use the multi-beam for receiving a downlink communication or transmitting an uplink communication. In some examples, the threshold time (or another parameter used for determining whether to form the multi-beam) may be based on the speed or velocity, motion state, or Doppler parameter associated with the motion of the UE.

Particular aspects of the subject matter described in this disclosure can be implemented to realize one or more of the following potential advantages. In some aspects, the described techniques can be used to request reference signals that are configured sufficiently to enable quality channel estimation to enable the use of a multi-beam. In some examples, by informing the base station of a requested or maximum sampling interval, the base station can select the requested sampling interval or a sampling interval less than or equal to the maximum sampling interval to ensure that the channel estimation is sufficient to enable the formation of an accurate multi-beam while conserving resources for other purposes. Additionally, the UE may transmit an indication of the motion of the UE to the base station to assist the base station in selecting an adequate interval for the reference signals. By enabling the formation of high quality multi-beams, the techniques described herein enable increased throughput and robustness to beam blockage, among other advantages.

FIG. 1 shows an example wireless communication network 100 that supports multi-beam generation in accordance with aspects of the present disclosure. The wireless communication network 100 may include numerous network nodes including base stations 102, UEs 104, and a core network 110. In some examples, the wireless communication network 100 may be a Long-Term Evolution (LTE) network, an LTE-Advanced (LTE-A) network, an LTE-A Pro network, or a New Radio (NR) network. In some examples, wireless communication network 100 may support enhanced broadband communications, ultra-reliable (for example, mission critical) communications, low latency communications, or communications with low-cost and low-complexity devices.

A base station 102 may include or may be referred to as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. In some examples, a base station 102 may be an integrated access and backhaul (IAB) node or a relay node. Each base station 102 may be associated with a geographic coverage area 106 in which communications with various UEs 104 is supported. Each base station 102 may provide communication coverage for a respective geographic coverage area 106 via wireless communication links 108. Communication links 108 between a base station 102 and a UE 104 may utilize one or more carriers and include uplink (UL) transmissions from a UE 104 to a base station 102 or downlink (DL) transmissions from a base station 102 to a UE 104. Downlink transmissions may also be called forward link transmissions while uplink transmissions may also be called reverse link transmissions.

The geographic coverage area 106 of a base station 102 may be divided into sectors making up a portion of the geographic coverage area 106, and each sector may be associated with a cell. For example, each base station 102 may provide communication coverage for a macro cell, a small cell, a hot spot, or other types of cells, or various combinations thereof. In some examples, a base station 102 may be movable and provide communication coverage for a moving geographic coverage area 106. In some examples, different geographic coverage areas 106 associated with different technologies may overlap, and overlapping geographic coverage areas 106 associated with different technologies may be supported by the same base station 102 or by different base stations 102. The wireless communication network 100 may include, for example, a heterogeneous LTE/LTE-A/LTE-A Pro or NR network in which different types of base stations 102 provide coverage for various geographic coverage areas 106.

The term "cell" refers to a logical communication entity used for communication with a base station 102 (for example, over a carrier), and may be associated with an identifier for distinguishing neighboring cells (for example, a physical cell identifier (PCID) or a virtual cell identifier (VCID)) operating via the same or different carriers. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 106 (for example, a sector) over which the logical entity operates.

UEs 104 may be dispersed throughout the wireless communication network 100, and each UE 104 may be stationary or mobile. A UE 104 may also be referred to as a mobile device, a wireless device, a remote device, a handheld device, or a subscriber device, or some other suitable terminology, where the "device" may also be referred to as a unit, a station, a terminal, or a client. A UE 104 may be a personal electronic device such as a cellular phone, a personal digital assistant (PDA), a tablet computer, a laptop computer, or a personal computer. In some examples, a UE 104 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some examples, a UE 104 may also be able to communicate directly with other UEs 104 (for example, using a peer-to-peer (P2P) or device-to-device (D2D) protocol). In some cases, one or more of a group of UEs 104 utilizing D2D communications may be within the geographic coverage area 106 of a base station 102. Other UEs 104 in such a group may be outside the geographic coverage area 106 of a base station 102, or be otherwise unable to receive transmissions from a base station 102. In some cases, groups of UEs 104 communicating via D2D communications may utilize a one-to-many (1:M) system in which each UE 104 transmits to every other UE 104 in the group. In some cases, a base station 102 facilitates the scheduling of resources for D2D communications. For example, a base station 102 may allocate shared resources for D2D communications via sidelinks between UEs 104. In other cases, D2D communications are carried out between UEs 104 without the involvement of a base station 102. In some examples, the UEs may perform beam training procedures to identify one or more characteristics or parameters to form directional beams on which to communicate with each other.

Base stations 102 may communicate with the core network 110 and with one another. For example, base stations 102 may interface with the core network 110 through backhaul links 112 (for example, via an S1, N2, N3, or other interface). Base stations 102 may communicate with one another over backhaul links 114 (for example, via an X2, Xn, or other interface) either directly (for example, directly between base stations 102) or indirectly (for example, via core network 110).

The core network 110 may provide user authentication, access authorization, tracking, Internet Protocol (IP) connectivity, and other access, routing, or mobility functions. The core network 110 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 104 served by base stations 102 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 102, may include subcomponents such as an access network entity, which may be an example of an access node controller (ANC). Each access network entity may communicate with UEs 104 through a number of other access network transmission entities, each of which may be referred to as a radio head, a smart radio head, or a transmission/reception point (TRP). In some configurations, various functions of each access network entity or base station 102 may be distributed across various network devices (for example, radio heads and access network controllers) or consolidated into a single network device (for example, a base station 102).

The wireless communication network 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter (dm) band, because the wavelengths range from approximately one dm to one meter (m) in length. UHF waves may be blocked or redirected by buildings and environmental features, but the waves may penetrate structures sufficiently for a macro cell to provide service to UEs 104 located indoors. The wireless communication network 100 may also operate in a super high frequency (SHF) region using frequency bands from 3 GHz to 30 GHz, also known as the centimeter (cm) band. The SHF region includes bands such as the 5 GHz industrial, scientific, and medical (ISM) bands, which includes spectrum typically used by Wi-Fi networks. The wireless communication network 100 may also operate in an extremely high frequency (EHF) region of the spectrum (for example, from 30 GHz to 300 GHz), also known as the millimeter (mm or "mmWave" or "mmW") band.

In some examples, the wireless communication network 100 may support millimeter wave communications between the base stations 102 and the UEs 104 or between base stations 102 and other base stations 102 (for example, between IAB nodes or relay nodes). Device capable of mmW communications may be referred to as "mmW devices." EHF antennas of mmW devices may be even smaller and more closely spaced than UHF antennas. In some cases, the size of the EHT antennas may facilitate the use of antenna arrays within a base station 102 or a UE 104. However, the propagation of EHF transmissions may be subject to even greater atmospheric attenuation and shorter range than SHF or UHF transmissions.

Figure 2:
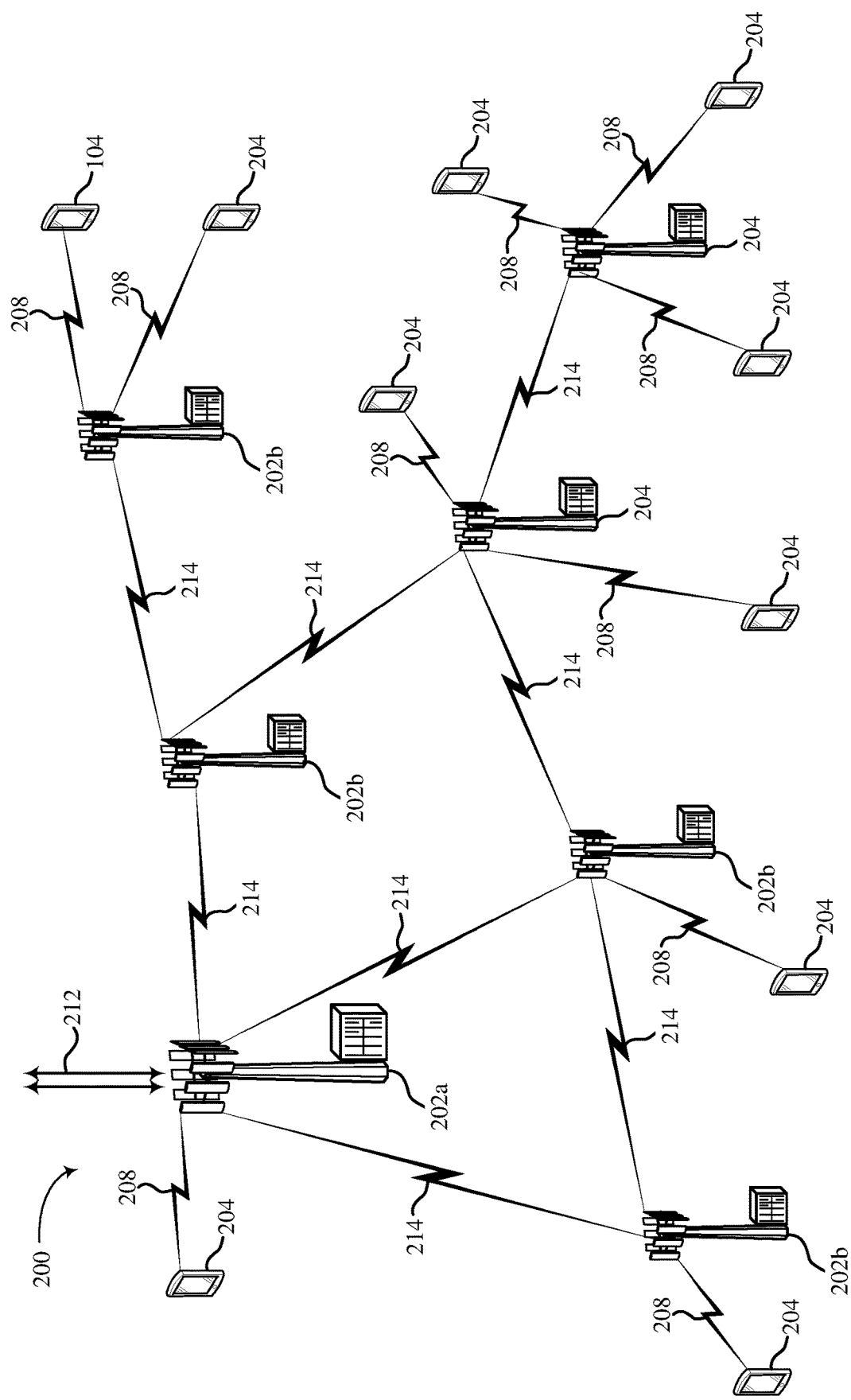
FIG. 2 illustrates another example wireless communication network that supports multi-beam generation in accordance with aspects of the present disclosure.

FIG. 2 illustrates another example wireless communication network 200 that supports multi-beam generation in accordance with aspects of the present disclosure. The wireless communication network 200 may include multiple base stations or other access nodes 202 (hereinafter collectively referred to as "base stations" although all access nodes may not include some functionalities of a typical base station) as well as multiple UEs 204. The wireless communication network 200 may include a wireless backhaul network, sometimes referred to as an integrated access and backhaul (IAB) network (hereinafter the wireless communication network 200 will also be referred to for ease of description as the IAB network 200). In the IAB network 200, at least one base station 202 is an anchor base station 202a, also referred to as an IAB donor (or "IAB-donor"). The IAB network 200 also includes one or more non-anchor base stations 202b, sometimes referred to as relay base stations or IAB nodes (or "IAB-nodes").

An anchor base station 202a may communicate with a core network via a wired backhaul link 212, such as a fiber connection. For example, an Ng interface of the IAB donor 202a may terminate at the core network. Additionally or alternatively, the IAB donor 202a may connect to one or more devices of the core network that provide a core access and mobility management function (for example, an access and mobility management function (AMF) entity). Each IAB donor 202a may include a central unit (CU), which may perform access node controller (ANC) functions, AMF functions, or the like. In some aspects, the CU may configure a distributed unit (DU) of the IAB donor 202a or may configure one or more IAB nodes 202b (for example, a mobile termination (MT) or a DU of an IAB node 202b) that connect to the core network via the IAB donor 202a. Accordingly, a CU of an IAB donor 202a may control or configure the entire IAB network 200 that connects to the core network via the IAB donor 202a, such as by using control messages or configuration messages, such as radio resource control (RRC) configuration messages, F1 application protocol (F1AP) messages, among other examples.

A non-anchor base station 202b may communicate directly or indirectly (for example, via one or more other non-anchor base stations 202b) with the anchor base station 202a via one or more wireless backhaul links 214 to form a backhaul path to the core network for carrying backhaul traffic. Additionally, each of the anchor base stations 202a and non-anchor base stations 202b may communicate with one or more UEs 204 via wireless access links 208 carrying access traffic.

The IAB network 200 may also utilize mmW technology for directional communications (for example, via beamforming) between IAB donor 202a and IAB nodes 202b, between IAB nodes 202b and other IAB nodes 202b, or between IAB nodes 202 and UEs 204. The use of directional millimeter wave communications may reduce inter-link interference. For example, millimeter-wave wireless backhaul links 214 between IAB donor 202a and IAB nodes 202b or between IAB nodes 202b and other IAB nodes 202b may enable the respective IAB donor 202a or other IAB nodes 202b to direct millimeter wave signals carrying information toward a target base station IAB donor 202a or other IAB node 202b using beamforming. Similarly, the wireless access links 208 between the IAB nodes 202b and the UEs 204 may enable the IAB nodes 202b and the UEs 204 to transmit beamformed millimeter wave signals toward each other.

As described above, each base station 102 or 202 is generally equipped with multiple antennas, which may be used to employ techniques such as transmit diversity, multiple-input multiple-output (MIMO), or beamforming. As described above, each UE 104 or 204 may also include multiple antennas that may be used to employ techniques such as receive diversity, MIMO, and beamforming. For example, MIMO communications may employ multipath signal propagation to increase the spectral efficiency by transmitting or receiving multiple signals via different spatial layers, which may be referred to as spatial multiplexing. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) in which multiple spatial layers are transmitted to the same receiving device, and multiple-user MIMO (MU-MIMO) in which multiple spatial layers are transmitted to multiple devices.

In some aspects, a UE 104 or 204 may communicate with a base station 102 or 202, and vice versa, using beamforming. Beamforming is a technique to form unicast beams between network nodes (for example, base stations 102 or 202 and UEs 104 or 204) that may improve the performance of a wireless communication link between the UE and the base station. Beamforming, which may also be referred to as spatial filtering, directional transmission, or directional reception, more specifically refers to signal processing techniques that may be used at a transmitting device or a receiving device (for example, a base station 102 or 202 or a UE 104 or 204) to shape or steer a beam of energy (for example, a transmit beam or a receive beam) along a spatial path between the transmitting device and the receiving device. Beamforming may be achieved by combining or adjusting the signals transmitted via the antenna elements of an antenna array such that signals propagating at different orientations or directions with respect to an antenna array experience constructive interference while others experience destructive interference. The adjustment of the signals transmitted via the respective antenna elements may include the application of amplitude and phase offsets to the signals to generate the beam.

A base station 102 or 202 may use multiple antennas or antenna arrays to conduct beamforming operations for directional communications with another network node such as another base station 102 or 202 or a UE 104 or 204. For example, a base station 102 or 202 may include an antenna system that includes multiple antenna modules for each of multiple respective orientations. Each antenna module may include an array of antenna elements (for example, a 16×8 array of patch antennas), which may have the same or one of two different polarizations. Each antenna module further includes supporting circuitry such as, for example, phase shifters, radio frequency (RF) chains, and IF chains.

A UE 104 or 204 may also include and use multiple antennas or antenna arrays to conduct beamforming operations for directional communications with a base station 102 or 202. For example, a UE 104 or 204 may include an antenna system that includes an array of antenna modules. Each antenna module may include one or more antenna elements of the same or different polarizations. For example, the antenna system may include four antenna modules each including an antenna subarray that includes a first antenna element having a first polarization and a second antenna element having a second, opposite polarization. For example, the first antenna elements may be patch antennas and the second antenna elements may be dipole antennas.

A beamforming operation may involve one or both of digital beamforming and analog beamforming. Digital beamforming is based on performing precoding based on codebooks and relates to operations performed on signals between the baseband processor and the RF chains that are coupled with the antenna elements of the base station 102 or 202 or the UE 104 or 204. Analog beamforming relates to operations performed on signals between the RF chains and the antenna elements. If the base station or the UE includes more antenna elements than RF chains, the respective device may apply analog precoding (or "analog combining") to the signals. For example, a base station 302 having an 8×8 array of antenna elements may have only two or four RF chains. In such an example, the number of layers that may be transmitted or received by the base station may also be limited by the number of RF chains.

Typically, only one antenna module is active or otherwise used at any particular time. The antenna modules are cycled using a combination of phase shifters that apply the phase offsets to perform beamforming in a particular direction. For example, a base station 102 or 202 or a UE 104 or 204 may transmit a signal in a particular direction based on the configuration of a respective beamforming weight set (also referred to as a "set of beam weights" or a "set of antenna weights") associated with the respective direction. Each set of beam weights may be associated with a particular transmit or receive beam and define the amplitudes and phase offsets for the power amplifiers and phase shifters, respectively, associated with the multiple antenna elements of the antenna module to form the transmit or receive beam. For example, a base station 102 or 202 may configure a set of beam weights for its antenna elements to generate a transmit beam that carries a signal on the downlink to a UE 104 or 204. A UE 104 or 204 may configure a set of beam weights for a receive beam, that is, a set of beam weights to be applied to its antenna elements to receive the signal transmitted by the base station 102 or 202 on the downlink. Similarly, a UE 104 or 204 may configure a set of beam weights for its antenna elements to generate a transmit beam that carries a signal on the uplink to a base station 102 or 202, and the base station 102 or 202 may configure a set of beam weights for a receive beam for the uplink.

A transmitting device (for example, a base station 102 or 202, which may be an example of a mmW device) may try multiple transmit beams when transmitting various signals to a receiving device (for example, a UE 104 or 204, which may be an example of a mmW device), such as synchronization signals, reference signals, beam selection signals, or other control signals. For example, the transmitting device may try multiple transmission directions by transmitting or processing the signals based on different sets of beam weights. Similarly, the receiving device (for example, a UE 104 or 204) may try multiple receive beams when receiving the signals from the transmitting device (for example, a base station 102 or 202). For example, the receiving device may try multiple reception directions by receiving or processing the signals based on different sets of beam weights.

Figure 3:
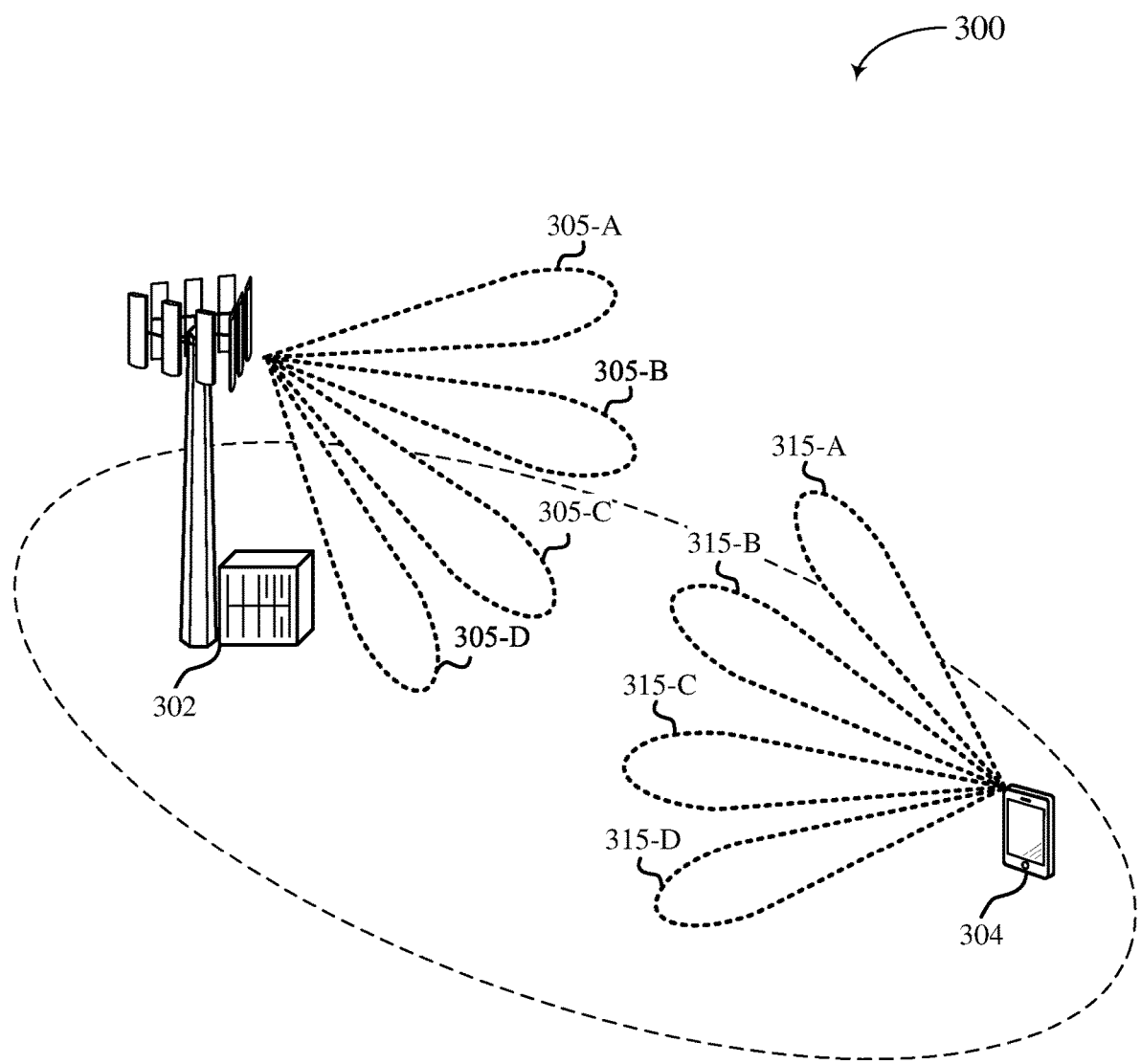
FIG. 3 illustrates an example of a wireless communication network that supports multi-beam generation in accordance with aspects of the present disclosure.

FIG. 3 illustrates an example of a wireless communication network 300 that supports multi-beam generation in accordance with aspects of the present disclosure. In some examples, the wireless communication network 300 may implement aspects of the wireless communication networks 100 or 200 described above with reference to FIGS. 1 and 2, respectively. For example, the wireless communication network 300 may include a base station 302 (which may be an example of the base stations 102 or 202) and a UE 304 (which may be an example of the UEs 104 or 204). The base station 302 and the UE 304 may support multiple radio access technologies (RATs) including 4G systems (for example, LTE systems, LTE-A systems, or LTE-A Pro systems) and 5G systems (which may be referred to as NR systems).

The base station 302 may perform one or more connection procedures (for example, one or more radio resource control (RRC) procedures such as a cell acquisition procedure, a random-access procedure, an RRC connection procedure, or an RRC configuration procedure) with the UE 304 to establish a connection (also referred to as a wireless link) for wireless communication. In some examples, the base station 302 and the UE 304 may also perform a connection procedure to re-establish a connection after a connection failure (for example, a radio link failure) or to establish a connection for handover to another base station. The connection procedure between the base station 302 and the UE 304 may correspond to, for example, at least one of the above example RATs.

In the example of FIG. 3, the base station 302 and the UE 304 may be mmW devices operating in mmW frequency ranges (for example, 28 GHz, 40 GHz, or 60 GHz bands) and the connection procedure may be related to mmW NR systems. As described above, wireless communications between the base station 302 and the UE 304 at these frequencies may be beamformed. As such, as part of the connection procedures, the base station 302 and the UE 304 may perform a beam pair establishment procedure to establish a beam pair link (BPL) (for example, including a downlink beam pair or an uplink beam pair) for communication between the base station 302 and the UE 304. For example, the base station 302 and the UE 304 may perform a beam sweep procedure, which may include base station-side beam pair refinement procedures and UE-side beam pair refinement procedures to refine the beams.

For example, in determining a suitable downlink beam pair, the base station 302 may transmit one or more beamformed communication beams ("transmit beams") in each of multiple different directions within a coverage area (for example, at variable beam widths or at different elevation angles). In the example shown in FIG. 3, the base station 302 may transmit beams 305-a through 305-d according to a beam sweep pattern. The UE 304 may generate receive beams 315-a through 315-d according to a same or different beam sweep pattern. Similarly, in determining a suitable uplink beam pair, the UE 304 may generate transmit beams in each of multiple different directions and the base station 302 may form receive beams in multiple different directions. In some other examples, after a downlink beam pair is determined, the base station 302 and the UE 304 may determine the uplink beam pair based on the downlink beam pair. In some such examples in which channel reciprocity is assumed, the base station 302 and the UE 304 may determine the uplink beam pair such that it matches the downlink bear pair within calibration adjustments. For example, for the base station 302, the set of beam weights (and the associated amplitude and phase offsets) configured for a downlink transmit beam may be the same as the set of beam weights configured for an uplink receive beam. As such, the beams 305-a through 305-d may also represent receive beams formed by the base station 302 for receiving uplink communications. Similarly, for the UE 304, the set of beam weights (and the associated amplitude and phase offsets) configured for a downlink receive beam may be the same as the set of beam weights configured for an uplink transmit beam. As such, the beams 315-a through 315-d may also represent transmit beams formed by the UE 304 for transmitting uplink communications.

As described above, the beams (for example, the beams 305-a through 305-d of the base station 302, and the beams 315-a through 315-d of the UE 304) may include one or more signals to support the suitable beam pair determination. Examples of such signals may include reference signals (for example, channel state information reference signals (CSI-RSs), sounding reference signals (SRSs), beam reference signals (BRSs), demodulation reference signals (DMRSs), or tracking reference signals (TRSs) and synchronization signals (for example, synchronization signal blocks (SSBs), primary synchronization signals (PSSs) or secondary synchronization signals (SSSs)), or any combinations of such signals, which may all be referred to generally as "reference signals"). Each beam may have an associated beam identifier and a beam direction, and include one or more beam symbols. As such, the base station 302 and the UE 304 may be capable of correlating a beam identifier, a beam direction and a beam symbol to a particular beam.

In some examples, the base station 302 may transmit one or more downlink reference signals to the UE 304 on each of multiple transmit beams 305 sequentially (for example, beginning with the beam 305-a and proceeding sequentially through the other beams 305-b, 305-c and 305-d). For example, the base station 302 may transmit a CSI-RS or a DMRS, among other possibilities, on each of the beams 305 one at a time. In some examples, the base station 302 and the UE 304 may perform a P1 procedure (also referred to as a "P1 sweep") to enable the discovery of new BPLs. For that purpose, the base station 302 may periodically transmit different symbols of a reference signal (referred to herein as a "P1-signal") on beams 305 formed in different spatial directions.

The UE 304 may attempt to determine an appropriate receive beam 315 for successful reception of at least a symbol of the reference signal. For example, the UE 120 may sweep through available receive beams 315, and may use different receive beams 315 during each occurrence of the periodic P1-signal to identify the appropriate receive beam 315. The UE 304 may perform channel measurements on each of the transmit beams 305 using each of the receive beams 315 based on the downlink reference signals. For example, the UE 304 may measure a reference signal received power (RSRP), a reference signal received quality (RSRQ), a signal-to-noise ratio (SNR), a signal-to-interference-plus-noise ratio (SINR), or an estimated block error rate (BLER), among other examples, for each of the beams. The UE 304 may then report some or all of the channel measurements, or channel quality parameters based on the channel measurements, to the base station 302. In some implementations utilizing the P1 procedure, the report may include a symbol index of the P1-signal. The base station 302 and the UE 304 may select respective beams based on the channel measurements or other channel quality parameters. For example, the base station 302 may select the beam 305-a based in part on an SNR or an RSRP, and the UE 304 may select the beam 315-a based in part on an SINR or an RSRQ.

After the performance of the P1 procedure, the base station 302 and the UE 304 may perform a BS-side beam pair refinement procedure, referred to herein as a P2 procedure (or "P2 sweep"). During the P2 procedure, the base station 302 may transmit symbols of a reference signal using each of a second set of different transmit beams that are relatively narrower than the transmit beam 305-a selected in the P1 procedure and spatially close to the selected beam (for example, within approximately two degrees of the wider transmit beam 305-a). As similarly described above for the initial P1 procedure, during the P2 procedure, the UE 304 may perform channel measurements on each of the second set of narrower transmit beams using the receive beam 315-a selected in the P1 procedure based on the downlink reference signals.

As described above, the UE 304 may measure an RSRP, an RSRQ, an SNR, an SINR or an estimated BLER, among other examples, for each of the second set of narrower transmit beams. The UE 304 may then report some or all of the channel measurements, or channel quality parameters based on the channel measurements, to the base station 302. The base station 302 may then select an active (or "primary") transmit beam based on the channel measurements or other channel quality parameters. Typically, the base station 302 selects the transmit beam of the second set of narrower transmit beams that provides the best performance for the base station 302 and the UE 304. It will be appreciated, however, that the base station 302 need not select or identify a best beam of the beams and that, instead, the base station 302 may select any suitable transmit beam using any suitable criteria, factors or thresholds.

The base station 302 and the UE 304 may also perform a UE-side beam pair refinement procedure, referred to herein as a P3 procedure (or "P3 sweep"). In some examples, the base station 302 may transmit symbols of a reference signal using the single transmit beam selected after the P2 procedure. During the P3 procedure, the UE 304 may receive symbols of the reference signal using each of a second set of different receive beams that are relatively narrower than the receive beam 315-*a* selected in the P1 procedure and spatially close to the selected beam (for example, within approximately two degrees of the wider receive beam 315-*a*). As similarly described above for the initial P1 procedure, during the P3 procedure, the UE 304 may perform channel measurements using each of the second set of narrower receive beams based on the downlink reference signal.

As described above, the UE 304 may measure an RSRP, an RSRQ, an SNR, an SINR or an estimated BLER, among other examples, for each of the second set of narrower receive beams. The UE may then select an active (primary) receive beam based on the channel measurements or other channel quality parameters. Typically, the UE 304 selects the receive beam from the second set of narrower receive beams that provides the best performance for the UE 304. It will be appreciated, however, that the UE 304 need not identify select or identify a currently best beam of the beams and that, instead, the UE 304 may select any suitable receive beam using any suitable criteria, factors or thresholds.

In some examples, the base station 302 and the UE 304 may then exchange reports indicating the selected active transmit and receive beams, respectively. For example, the base station 302 may transmit a report including an indication of the active transmit beam to the UE 304 via RRC signaling, a MAC control element (MAC-CE), downlink control information (DCI), or other suitable signaling. Similarly, the UE 304 may transmit a report including an indication of the active receive beam to the base station 302 via RRC signaling, a MAC-CE, uplink control information (UCI), or other suitable signaling. As described above, upon the performance of the active beam selection, the base station 302 and the UE 304 may establish a BPL and a connection (for example, such as a wireless communication link 108 or 208) to perform beamformed wireless communications using the active transmit and receive beams.

It should also be appreciated that, additionally or alternatively, the UE 304 may transmit one or more uplink reference signals to the base station 302 on each of multiple uplink transmit beams. For example, the UE 304 may transmit an SRS or a TRS, among other possibilities, on each of the beams. The base station 302 may similarly receive and perform channel measurements based in part on the one or more uplink reference signals. For example, the base station 302 may measure an RSRP, an RSRQ, an SNR, or an SINR, and report the channel measurements to the UE 304. The base station 302 and the UE 304 may then each select a beam based on the measurements or other channel quality parameters.

In some examples, when selecting their respective beams for downlink or uplink communications, the base station 302 and the UE 304 may also each select a respective candidate (or "secondary") beam as a fallback beam in instances in which a quality of the active beam falls below a threshold (for example, an RSRP threshold or an RSRQ threshold). For example, the base station 302 may select another one of the transmit beams 305 (for example, the beam 305-*b*) as a secondary beam. Similarly, the UE 304 may select another one of the receive beams 315 (for example, the beam 315-*b*) as a secondary beam. Additionally or alternatively, the base station 302 may select a secondary transmit beam from the second set of narrower transmit beams generated for the P2 procedure. Similarly, the UE 304 may select a secondary receive beam from the second set of narrower receive beams generated for the P3 procedure.

The base station 302 or the UE 304 may switch, if necessary, advantageous or otherwise desirable, to the respective secondary beam (which would then become the active beam) and establish a new BPL. For example, the quality of the established communication link (for example, a quality of an active beam pair) between the base station 302 and the UE 304 may vary over time, for example, due to mobility of the UE 304, dynamic blockages (for example, physical obstructions), or other changes to channel conditions. In some examples, the base station 302 may periodically or aperiodically transmit reference signals to the UE 304 so that the UE 304 may perform one or more channel measurements to monitor a value of a channel quality parameter of the communication link between the base station 302 and the UE 304. For example, the UE 304 may determine that an RSRP of an active beam has fallen below a threshold (for example, below an RSRP threshold). This determination may trigger the UE 304 to switch to a new active beam (for example, from the beam 315-*a* to the beam 315-*b*) and, in some examples, to report the measurement to the base station 302, which may trigger the base station 302 to perform a beam management procedure. For example, in response to the report from the UE 304, the base station 302 may perform a beam switch procedure to switch to a new active beam (for example, from the beam 305-*a* to the beam 305-*b*). Alternatively, the UE 304 may periodically or aperiodically transmit a reference signal to the base station 302, so that the base station 302 may perform one or more channel measurements to monitor a value of a channel quality parameter of the communication link.

In some examples, the base station 302 may transmit a beam switch message to the UE 304 that includes beam switch timing information (for example, time (and frequency) resources such as a slot index) and a request for the UE 304 to perform a beam switch procedure, during a beam switch window, based on the beam switch timing information. The beam switch window may indicate a time interval when a beam switch event is scheduled to occur (for example, during a particular slot or symbol). The beam switch procedure may result in the UE 304 switching from communicating with the base station 302 using an active beam (for example, the beam 315-*a*) to communicating with the base station 302 using a secondary beam (for example, the beam 315-*b*). As a result, the UE 304 may eliminate or mitigate any interruption in communication with the base station 302 and not require the performance of a beam failure recovery procedure.

As described above, in some examples, after the base station 302 and the UE 304 select their primary transmit and receive beams, the base station 302 may transmit additional reference signals to the UE 304 periodically or aperiodically. For example, the base station 302 may transmit CSI-RSs to the UE 304 periodically or aperiodically (for example, upon request by the UE 304). The UE 304 may, as described above, perform measurements on the CSI-RSs and transmit reports back to the base station 302. For example, in response to receiving a CSI-RS, the UE 304 may transmit a CSI report that provides to the base station 302 an indication of the channel conditions at a particular time. In some examples, the CSI report may include channel quality information (CQI), a precoding matrix indicator (PMI), rank information (RI), various channel measurements, or a combination thereof. The transmissions of the CSI reports by the UE 304 may be configurable. For example, the UE 304 may be configured to transmit a CSI report periodically or aperiodically. For periodic CSI reporting, the UE 304 may transmit the CSI reports at particular periodic intervals that may be configured by a higher layer (for example, via RRC signaling). For aperiodic CSI reporting, the UE 304 may transmit a CSI report in response to a request from the base station 302. For example, the base station 302 may request a CSI report from the UE 304 by signaling a request in a control message (for example, in DCI). In some examples, the UE 304 may identify and indicate a time stamp for one or more values of a channel quality parameter or a timing of the measurements performed to determine the one or more values of the channel quality parameter.

A receiving device such as the UE 304 needs to solve a set of equations to obtain a channel estimate to select a receive beam and determine the set of beam weights for the selected beam. The form and generation of the equations is generally implementation specific. The number of equations needed is based on the number of antennas to be used for the beamforming. For example, to perform beamforming using four antennas, the UE 304 would need to solve four equations. As such, a sampling period for each reference signal transmitted by the base station 302 would need to include four sampling instances. In some examples, the UE 304 may use or activate only one antenna per sampling instance to obtain channel measurements for a single antenna in each of the sampling instances. In some other examples, the UE 304 may use or activate all four antennas per sampling instance to obtain channel measurements for all of the antennas in each of the sampling instances. The sampling frequency is defined by the interval (referred to herein as a "sampling interval") between the sampling instances within the sampling period. For example, the sampling interval may be, or be on the order of, 1 millisecond (ms).

In some examples, the particular transmit and receive beams selected by the base station 302 and the UE 304 may not be along a line of sight direction. For example, there may be multiple at least partially reflective or diffractive physical objects (or "clusters") in an area between the base station 302 and the UE 304. In such examples, the active transmit and receive beams may not provide optimal channel conditions. Additionally, in some examples, the secondary transmit and receive beams, while less favorable than the active transmit and receive beams, may also provide channel conditions suitable for some wireless communications.

In some aspects, a base station 302 or a UE 304 may perform analog beamforming to form a transmit or receive beam based on both the respective selected active and secondary beams (referred to herein as a "multi-beam"). In some examples, all of the antenna elements of the particular active antenna module may be used to form the respective transmit or receive multi-beam. For example, the base station 302 may generate a transmit beam in the form of a multi-beam based on the set of beam weights associated with the beam 305-a and the beam 305-b. The generation of the multi-beam from the individual beams 305-a and 305-b can be implementation specific. Similarly, the UE 304 may generate a receive beam in the form of a multi-beam based on the set of beam weights associated with the beam 315-a and the beam 315-b. Unlike the single beams 305 and 315 described above, which include only a single respective dominant peak or lobe, a multi-beam is associated with a beam pattern that includes at least two dominant peaks (for example, one associated primarily with a primary beam and one associated primarily with a secondary beam).

In some examples, the base station 302 or the UE 304 may dynamically switch between the use of a single beam scheme, such as that described above, to the use of a multi-beam scheme, and vice versa. For example, in instances in which the UE 304 may be moving at relatively high velocities (associated with a moderate or high Doppler spread), a single beam scheme may provide the best performance over a duration of time or otherwise be favorable. However, in instances in which the UE 304 is stationary or moving at relatively low velocities (associated with a low Doppler spread), the use of a multi-beam may provide the best performance. However, the formation of a multi-beam is generally based on obtaining relatively good, effective channel estimates. Generally, the smaller the sampling interval, the better the quality of the channel estimate obtained from the measurements performed at the sampling instances.

In some examples, a base station 302 or a UE 304 may not apply the determined beam weights (including the phase shifter values) for the respective multi-beams immediately. For example, it may be necessary, beneficial or otherwise suitable or desirable to apply or configure the beam weights for the multi-beam at a future time, which may be a relatively distant time (for example, 200 milliseconds (ms) to 1 second (s) or more after the determination of the beam weights). This may be necessary because of slower circuit switching and UE side capabilities that do not permit quick usage of the determined beam weights. The time at which the UE 304 is to apply the beam weights is referred to herein as a "usage instance" and may be defined by a downlink or uplink grant by the base station 302. For example, the usage instance may be, or be on the order of, 10 ms, 14 ms, 20 ms, 50 ms, 100 ms or 200 ms from the end of the sampling period. In instances of high mobility, the set of beam weights (and the associated amplitude and phase offset values) may no longer be suitable at the time of the usage instance because of Doppler effects on the multi-beam. As such, the duration of time between the sampling period and the usage instance is related to the relevance of the information obtained by the channel measurements during the sampling period.

Aspects of the present disclosure generally relate to wireless communication, and specifically, to techniques and apparatuses for analog beamforming for millimeter-wave multi-beam generation. In various examples, a UE may determine a sampling interval for a set of wireless references signals yet to be transmitted by a base station for an upcoming control or data communication. For example, the UE may determine a maximum sampling interval tolerable by the UE for channel estimation and select the sampling interval based on the determined maximum. In some examples, the UE determines the sampling interval based on a speed or velocity, a motion state, or a Doppler parameter associated with motion of the UE. In some examples, the UE may additionally determine the sampling interval based on one or more quality of service (QoS) parameters, such as a throughput or latency requirement. As described above, a UE may require a sufficiently short sampling interval in order to obtain an accurate channel estimate so that it may then form an accurate multi-beam. The UE may transmit control information to the base station that indicates the sampling interval. The control information may also include a request for the reference signals for the channel estimation.

The base station may receive the control information, select an interval for the reference signals, and transmit the reference signals to the UE. Advantageously, the base station may determine to select an interval for the reference signals that is less than or equal to the sampling interval indicated in the control information received from the UE. Upon receiving the reference signals, the UE may perform a channel estimation operation to determine a set of beam weights for forming the multi-beam. The UE may also determine whether the interval associated with the reference signals is less than or equal to the determined sampling interval it earlier indicated to the base station. If so, and if a time of a downlink or uplink grant during which the multi-beam may be used is within a threshold time, the UE may select to use the multi-beam for receiving a downlink communication or transmitting an uplink communication. In some examples, the threshold time (or another parameter used for determining whether to form the multi-beam) may be based on the speed or velocity, motion state, or Doppler parameter associated with the motion of the UE.

Particular aspects of the subject matter described in this disclosure can be implemented to realize one or more of the following potential advantages. In some aspects, the described techniques can be used to request reference signals that are configured sufficiently to enable quality channel estimation to enable the use of a multi-beam. In some examples, by informing the base station of a requested or maximum sampling interval, the base station can select the requested sampling interval or a sampling interval less than or equal to the maximum sampling interval to ensure that the channel estimation is sufficient to enable the formation of an accurate multi-beam while conserving resources for other purposes. Additionally, the UE may transmit an indication of the motion of the UE to the base station to assist the base station in selecting an adequate interval for the reference signals. By enabling the formation of high quality multi-beams, the techniques described herein enable increased throughput and robustness to beam blockage, among other examples.

Figure 4:
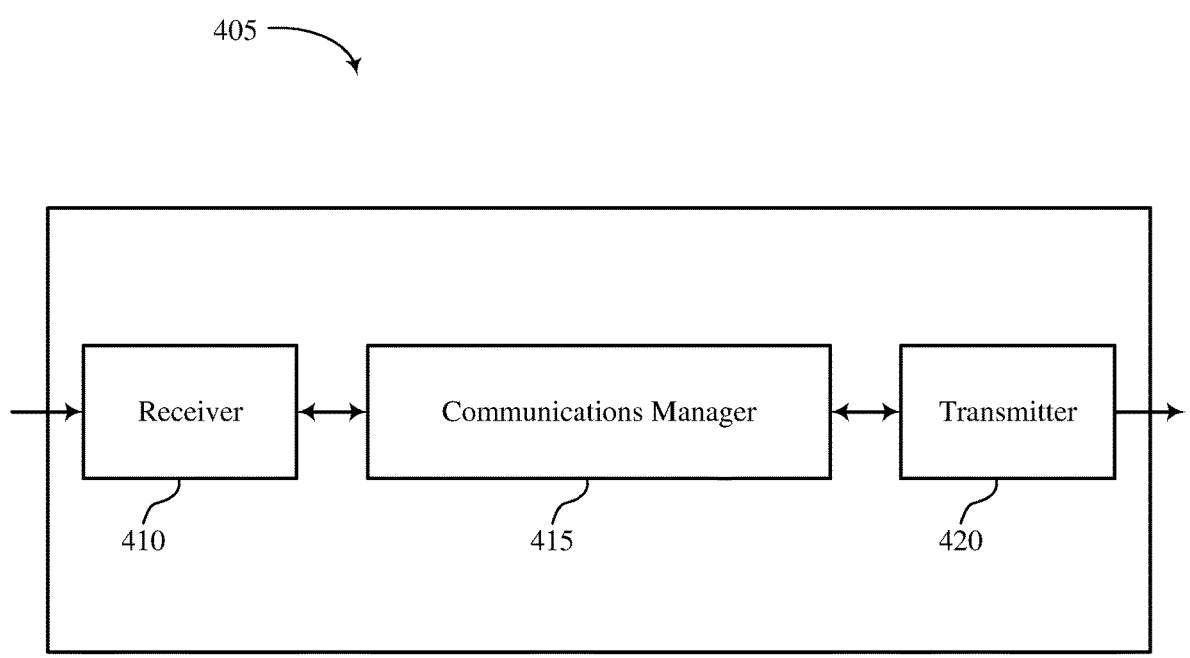
FIG. 4 shows a block diagram of a wireless communication device that supports multi-beam generation in accordance with aspects of the present disclosure.

FIG. 4 shows a block diagram of a wireless communication device 405 that supports multi-beam generation in accordance with aspects of the present disclosure. The wireless communication device may be an example of aspects of a UE 104, 204 or 304 described with reference to FIGS. 1-3, respectively. The wireless communication device 405 includes a receiver 410, a communication manager 415, and a transmitter 420, which may be in communication with one another (for example, via one or more buses). In some examples, the wireless communication device 405 is configured to perform operations including operations of the process 1300 described below with reference to FIGS. 13A and 13B. In some examples, the wireless communication device 405 can include a chip, SoC, chipset, package or device that includes at least one processor and at least one modem (for example, a 5G modem or other cellular modem). In some examples, the communication manager 415, or its sub-components, may be separate and distinct components. In some examples, at least some components of the communication manager 415 are implemented at least in part as software stored in a memory. For example, portions of one or more of the components of the communication manager 415 can be implemented as non-transitory instructions (or "code") executable by the processor to perform the functions or operations of the respective component.

The receiver 410 may receive reference signals (for example, periodically configured CSI-RSs, aperiodically configured CSI-RSs, or multi-beam-specific reference signals), synchronization signals (for example, SSBs), control information and data information, such as in the form of packets, via various channels including control channels (for example, a physical downlink control channel (PDCCH)) and data channels (for example, a physical downlink shared channel (PDSCH)). The received information may be passed on to other components of the device 405. The receiver 410 may be an example of aspects of the radio 706 described with reference to FIG. 7. The receiver 410 may be coupled with or otherwise utilize a set of antennas (for example, the set of antennas may be an example of aspects of the antenna system 825 described with reference to FIG. 8).

The transmitter 420 may transmit signals generated by the communication manager 415 or other components of the wireless communication device 405. In some examples, the transmitter 420 may be collocated with the receiver 410 in a transceiver. The transmitter 420 may be an example of aspects of the radio 706 described with reference to FIG. 7. The transmitter 420 may be coupled with or otherwise utilize a set of antennas (for example, the set of antennas may be an example of aspects of the antenna system 825 described with reference to FIG. 8), which may be antenna elements shared with the receiver 410. In some examples, the transmitter 420 is configured to transmit control information in a physical uplink control channel (PUCCH) and data in a physical uplink shared channel (PUSCH).

The communication manager 415 may determine, based on motion of the device 405, a first sampling interval for a set of sampling instances for a wireless channel estimation operation for a multi-beam having a beam pattern with multiple dominant peaks. The communication manager 415 may cause the transmitter 420 to transmit, to a second wireless communication device (for example, a base station such as a base station 302 described with reference to FIG. 3), first control information including an indication of the first sampling interval, an indication of a capability of the device 405 for analog beamforming, and a request for a number of wireless reference signals (RSs) for the multi-beam.

Figure 5:
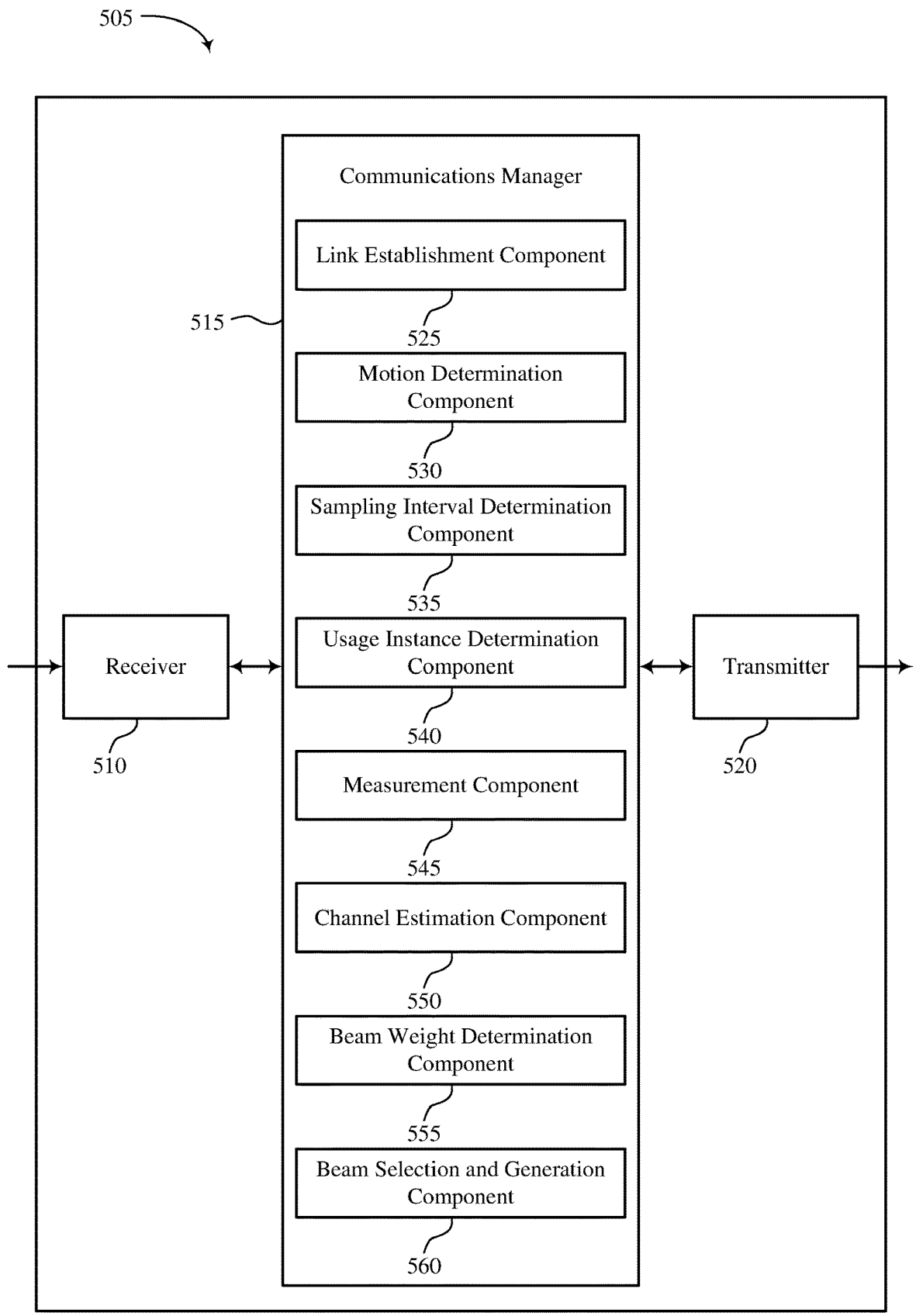
FIG. 5 shows a block diagram of a wireless communication device that supports multi-beam generation in accordance with aspects of the present disclosure.

FIG. 5 shows a block diagram of a wireless communication device 505 that supports multi-beam generation in accordance with aspects of the present disclosure. The device 505 may be an example of aspects of a wireless communication device 405 or a UE 104, 204 or 304 described with reference to FIGS. 1-4. The wireless communication device 505 may include a receiver 510, a communication manager 515, and a transmitter 520, which may be in communication with one another (for example, via one or more buses). In some examples, the wireless communication device 505 is configured to perform operations including operations of the process 1300 described below with reference to FIGS. 13A and 13B. In some examples, the wireless communication device 505 can include a chip, SoC, chipset, package or device that includes at least one processor and at least one modem (for example, a 5G modem or other cellular modem). In some examples, the communication manager 515, or its sub-components, may be separate and distinct components. In some examples, at least some components of the communication manager 515 are implemented at least in part as software stored in a memory. For example, portions of one or more of the components of the communication manager 515 can be implemented as non-transitory code executable by the processor to perform the functions or operations of the respective component.

The receiver 510 may receive reference signals (for example, periodically configured CSI-RSs, aperiodically configured CSI-RSs, or multi-beam-specific reference signals), synchronization signals (for example, SSBs), control information and data information, such as in the form of packets, from a second wireless communication device (for example, a base station) via various channels including control channels (for example, a PDCCH) and data channels (for example, a PDSCH). The received information may be passed on to other components of the device 505. The receiver 510 may be an example of aspects of the radio 706 described with reference to FIG. 7. The receiver 510 may include a set of RF chains that are coupled with or otherwise utilize a set of antennas (for example, the set of antennas may be an example of aspects of the antenna system 825 described with reference to FIG. 8).

The transmitter 520 may transmit signals generated by the communication manager 515 or other components of the wireless communication device 505. In some examples, the transmitter 520 may be collocated with the receiver 510 in a transceiver. The transmitter 520 may be an example of aspects of the radio 706 described with reference to FIG. 7. The transmitter 520 may be coupled with or otherwise utilize a set of antennas (for example, the set of antennas may be an example of aspects of the antenna system 825 described with reference to FIG. 8), which may be antenna elements shared with the receiver 510. In some examples, the transmitter 520 is configured to transmit control information in a PUCCH and data in a PUSCH.

The communication manager 515 may be an example of aspects of the communication manager 415 described with reference to FIG. 4. The communication manager 515 includes a link establishment component 525, a motion determination component 530, a sampling interval determination component 535, a usage instance determination component 540, a channel measurement component 545, a channel estimation component 550, a beam weight determination component 555, and a beam selection and generation component 560.

The link establishment component 525 is configured to establish a link with the second wireless communication device including the establishment of a BPL as, for example, described with reference to FIG. 3. For example, the link establishment component 525 may, in conjunction with the beam weight determination component 555 and the beam selection and generation component 560, perform a beam training operation with the second wireless communication device. For example, the measurement component 545 may perform one or more measurements on a set of reference signals or synchronization signals (again, collectively referred to as reference signals) obtained by the receiver 510 via one or more respective antenna elements of the set of antenna elements. The channel estimation component 550 may then perform a channel estimation operation based on the measurements performed by the measurement component 545 to obtain a channel estimate for multiple candidate single beams, each having a corresponding beam pattern with a single dominant peak. The beam weight determination component 555 may then select or otherwise determine a set of beam weights for each of one or more subsets of antenna elements of the set of antenna elements for each of one or more of the reference signals obtained by the receiver 510 based on the channel estimation operation performed by the channel estimation component 550. The beam selection and generation component 560 may then select one of the single beams and configure the determined set of beam weights for the single beam.

In some examples, the receiver 510 may receive, from the second wireless communication device, control information via the single beam based on the configuration of the set of single-beam weights. The measurement component 545 may then again perform one or more measurements and the channel estimation component 550 may then perform another channel estimation operation based on the new measurements. Based on the channel estimation operation, the beam selection and generation component 560 may determine to switch to a multi-beam having a beam pattern with multiple dominant peaks.

The motion determination component 530 may determine one or more motion characteristics or parameters associated with motion of the wireless communication device 505. For example, the motion determination component 530 may receive sensor data from one or more sensors (for example, one or more inertial sensors, gyroscopic devices or other motion sensors, among other examples) as well as location data (for example, from a global positioning service (GPS) component or another location determination component that may determine a location of the wireless communication device via cell triangulation, among other examples). The motion determination component 530 may generate motion information or determine a motion state that quantifies or otherwise characterizes the motion of the wireless communication device 505. For example, the motion information may include, or the motion state may indicate, one or more motion values or parameters such as a speed or velocity associated with the motion of the wireless communication device or a Doppler value or parameter associated with the motion. The motion determination component 530 may output signaling including the motion information. In some such examples, the first control information may further include the motion information for, or the motion state of, the wireless communication device 505.

The sampling interval determination component 535 may be coupled with the motion determination component 530 and may determine, based on the motion information received from the motion determination component 530, a first sampling interval $\Delta_{S1}$ for a set of sampling instances for a wireless channel estimation operation for the multi-beam. For example, the sampling interval determination component 535 may determine the first sampling interval $\Delta_{S1}$ based on the speed or velocity associated with the motion of the wireless communication device 505. In some examples, the first sampling interval $\Delta_{S1}$ is a maximum sampling interval tolerable by the wireless communication device 505 (for examples, tolerable by the wireless communication device 505 to perform channel estimation of sufficient quality to generate a multi-beam via analog beamforming). In some other examples, the sampling interval determination component 535 may determine a specific sampling interval it requests and the first sampling interval $\Delta_{S1}$ is the specific requested sampling interval. In some examples, the sampling interval determination component 535 may select a value for the first sampling interval $\Delta_{S1}$ from a set of preconfigured values. In some examples, the sampling interval determination component 535 may determine the first sampling interval $\Delta_{S1}$ based further on one or more QoS parameters, such as a data rate requirement or a latency requirement of the wireless communication device 505. In some such examples, the first control information may further include the data rate requirement or the latency requirement of the wireless communication device 505.

The communication manager 515 may transmit (or cause to be transmitted via the transmitter 520), to a second wireless communication device (for example, a base station such as a base station 302), first control information including an indication of the first sampling interval $\Delta_{S1}$, an indication of one or more capabilities of the wireless communication device 505 for analog beamforming, and a request for a number of wireless reference signals (for example, a set of CSI-RSs) or synchronization signals (for example, a set of SSBs) for the multi-beam. In some specific examples, the request for the number of reference signals may be a request for an aperiodically-configured set of CSI-RSs (for example, a set of CSI-RSs that corresponds to a sampling period and that is configured aperiodically, but which itself includes multiple CSI-RS resources (or simply "CSI-RSs") arranged periodically within the set according to a sampling interval). In some examples, the first control information is transmitted in a beam report via the PUCCH.

In some examples, the indication of the capability for analog beamforming includes at least one of an indication of a number of antenna elements of a set of antenna elements of the wireless communication device 505, an indication of a number of RF chains of the wireless communication device 505 coupled with the set of antenna elements, or an indication of a capability to perform a phase-and-signal-strength-based channel estimate or a signal-strength-only-based channel estimate.

The usage instance determination component 540 may determine a time of a usage instance or a duration or interval $\Delta_U$ from a start or end of the sampling period and the time of the usage instance. For example, the usage instance determination component 540 may identify a time of a downlink grant or an uplink grant and determine the time of the usage instance as, or based on, the time of the downlink or uplink grant. For example, the usage instance determination component 540 may receive (via the receiver 510) scheduling information, for example, in downlink control information (DCI), that identifies time and frequency resources for a downlink or uplink grant during which the wireless communication device 505 may receive data from, or transmit data to, the second wireless communication device via a multi-beam in accordance with aspects of the present disclosure. In some examples, the usage instance determination component 540 may also estimate the time of the usage instance based on a data rate requirement or a latency requirement of the wireless communication device 505. In some examples, the usage instance determination component 540 may select a value for the estimated usage instance from a set of preconfigured values. In some examples, the usage instance determination component 540 selects or estimates the interval $\Delta_U$ as a maximum duration of time by which the multi-beam weights can be used that is tolerable by the wireless communication device 505. In some examples, the first control information transmitted to the second wireless communication device further includes an indication of the maximum duration of time $\Delta_U$.

Figure 6:
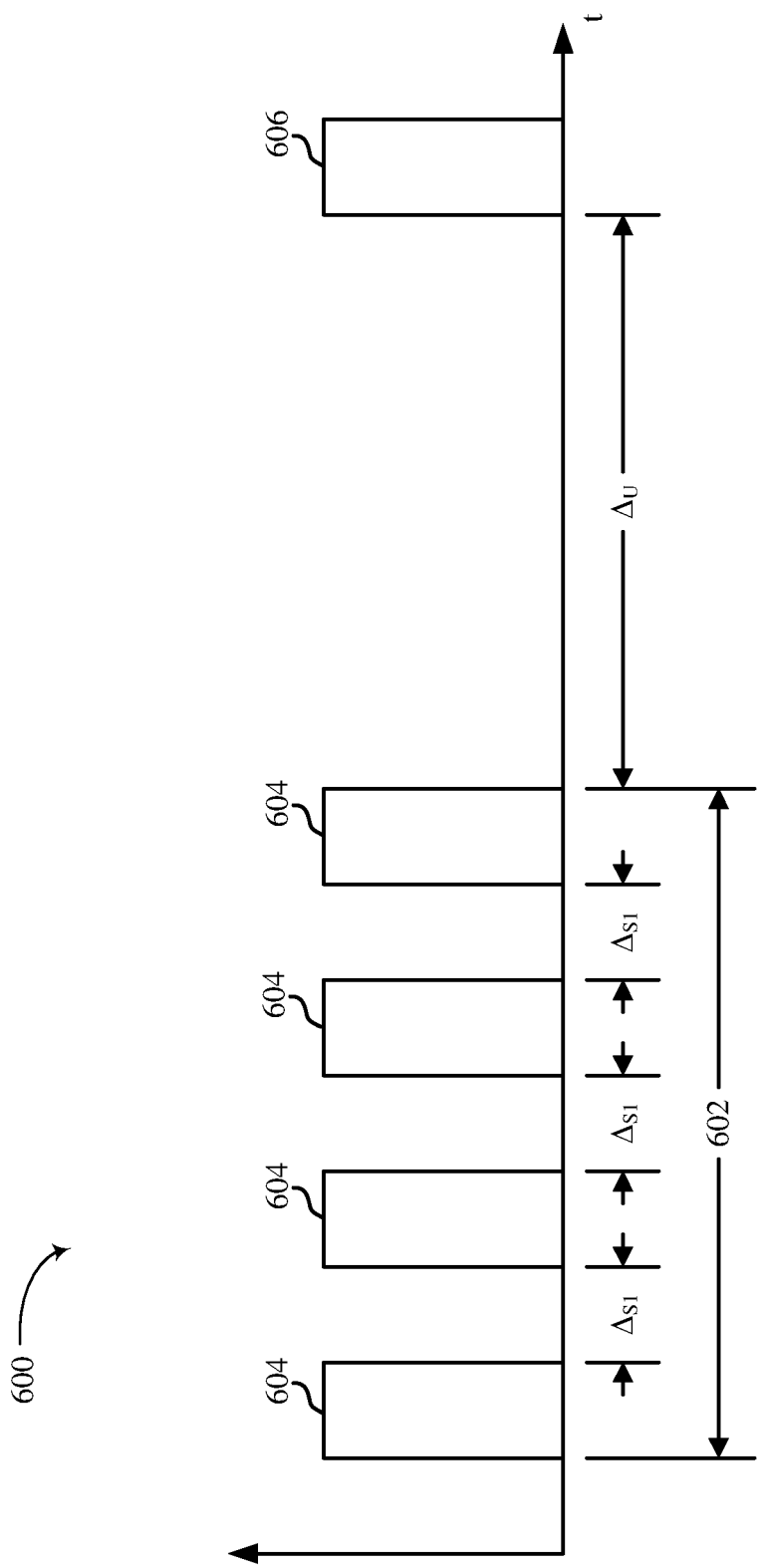
FIG. 6 shows an example timeline that supports multi-beam generation in accordance with aspects of the present disclosure.

FIG. 6 shows an example timeline 600 that supports multi-beam generation in accordance with aspects of the present disclosure. The timeline 600 may be an example of aspects of operations performed by the wireless communication device 505. The timeline 600 includes a sampling period or duration 602 during which the receiver 510 receives the reference signals and the measurement component 545 performs one or more measurements at each of multiple sampling instances 604 according to a sampling interval. As shown, the sampling interval determination component 535 may select the first sampling interval $\Delta_{S1}$ based on estimating the sampling instances 604 it needs to perform a sufficiently high quality channel estimation operation for the multi-beam. The timeline 600 further illustrates the estimated time (for example, the maximum interval $\Delta_U$) for the usage instance 606 selected or determined by the usage instance determination component 540, which, as shown, may begin at the end of the sampling period 602.

Referring also back to FIG. 5, the receiver 510 may further receive, from the second wireless communication device after the transmission of the first control information, second control information including an indication of a second sampling interval $\Delta_{S2}$ for the set of sampling instances 604. For example, the receiver 510 may receive the second control information in a PDCCH. The second sampling interval $\Delta_{S2}$ may be the same as or different than the first sampling interval $\Delta_{S1}$. For example, it may be up to the second wireless communication device whether it will honor the request from the wireless communication device 505. For example, in instances in which the first sampling interval $\Delta_{S1}$ is a specific requested sampling interval, the second wireless communication device may determine to use, or to not use, the first sampling interval $\Delta_{S1}$ as the second sampling interval $\Delta_{S2}$. In other instances in which the first sampling interval $\Delta_{S1}$ is a maximum sampling interval, the second wireless communication device may determine to select a second sampling interval $\Delta_{S2}$ that is less than or equal to the first sampling interval $\Delta_{S1}$. The second control information may explicitly or implicitly indicate whether the first sampling interval $\Delta_{S1}$ requested by the UE has been granted.

The receiver 510 may also receive, from the second wireless communication device via a set of antenna elements, a set of reference signals (for example, periodically configured CSI-RSs, aperiodically configured CSI-RSs, or multi-beam-specific reference signals) or synchronization signals (for example, SSBs) for the channel estimation operation according to the second sampling interval $\Delta_{S2}$. The measurement component 545 may perform one or more measurements on the set of reference signals or synchronization signals (again, collectively referred to as reference signals) obtained via one or more respective antenna elements of the set of antenna elements at each of the sampling instances 604 of the set of sampling instances according to the second sampling interval $\Delta_{S2}$.

The channel estimation component 550 may then perform a channel estimation operation based on the measurements performed by the measurement component 545 to obtain a channel estimate for the multi-beam. In some examples, the channel estimation operation includes a phase-and-signal-strength-based channel estimation. In some other examples, the channel estimation operation includes a signal-strength-only-based channel estimation. In some examples, the performance of the channel estimation operation includes determining a signal strength for the channel estimate. For example, the determination of the signal strength may include determining at least one of a reference signal received power (RSRP), a reference signal received quality (RSRQ), a signal-to-noise ratio (SNR), a signal-to-interference and noise ratio (SINR), a signal-to-interference ratio (SIR), or a received signal strength indicator (RSSI). In some examples, the performance of the channel estimation operation also includes determining a phase for the channel estimate based on a comparison of complex signals in in-phase (I) and quadrature (Q) components of the channel estimate.

The beam weight determination component 555 is configured to select or otherwise determine a set of beam weights for each of one or more subsets of antenna elements of the set of antenna elements for each of one or more of the reference signals obtained by the receiver 510 based on the channel estimation operation performed by the channel estimation component 550 and based on the UE capabilities for analog beamforming. The beam selection and generation component 560 may then determine and configure a set of multi-beam weights for the multi-beam based on the selection of the set of beam weights.

The communication manager 515 may then transmit control or data information to, or receive control or data information from, the second wireless communication device via the configured multi-beam at an actual usage instance (for example, defined by a downlink or uplink grant received from the second wireless communication device via DCI or other signaling) based on at least one of a time of the usage instance, a speed or a velocity associated with the UE, or the second sampling interval. For example, the beam selection and generation component 560 may determine, based on comparing the time of the usage instance to a threshold, whether the set of beam weights configured for the multi-beam will still be relevant or otherwise suitable for use at the actual usage instance. Additionally or alternatively, the beam selection and generation component 560 may determine, based on comparing the speed or velocity to a threshold, whether the set of beam weights configured for the multi-beam will still be suitable for use at the actual usage instance. Additionally or alternatively, the beam selection and generation component 560 may determine, based on comparing the second sampling interval $\Delta_{S2}$ to a threshold, whether the second sampling interval $\Delta_{S2}$ is sufficiently narrow or short such that the channel estimation operation performed by the channel estimation component 550 is of sufficient quality for the set of beam weights configured for the multi-beam to be accurate enough for use at the actual usage instance. In some examples, if the beam selection and generation component 560 determines that all (or alternatively, one or more of) these conditions are satisfied, the communication manager 515 may then transmit or receive the control or data information via the multi-beam at the usage instance. In some examples, if the beam selection and generation component 560 determines that one or more of these conditions are not satisfied, it may determine to switch to or otherwise use a single beam. In such latter examples, the communication manager 515 may then use the single beam to transmit or receive the control or data information at the usage instance.

Figure 7:
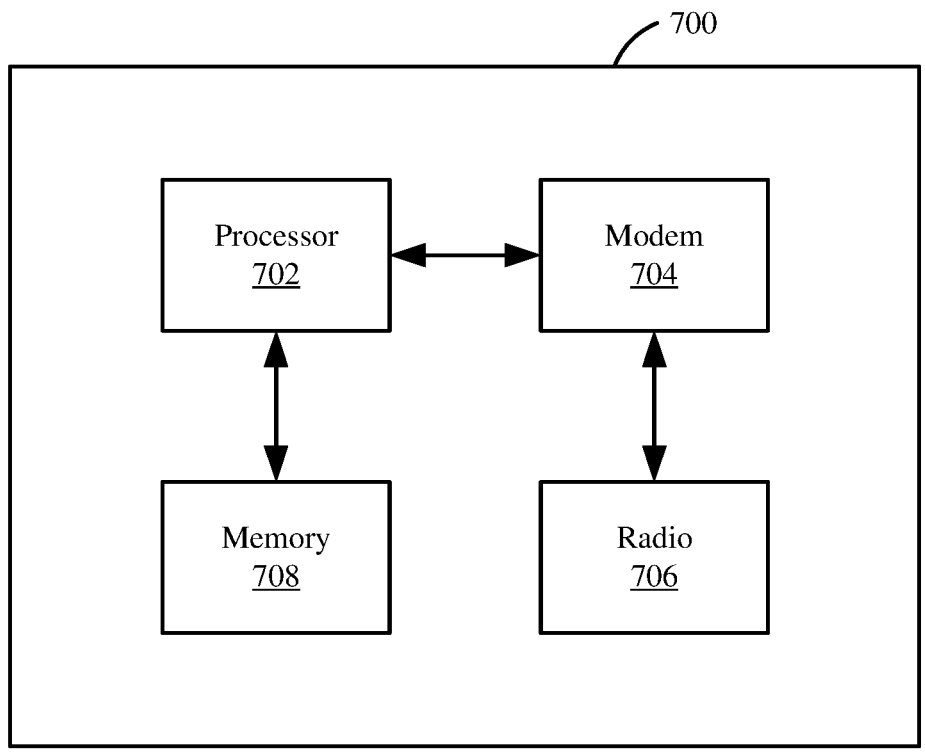
FIG. 7 shows a block diagram of an example wireless communication device that supports multi-beam generation in accordance with aspects of the present disclosure.

FIG. 7 shows a block diagram of an example wireless communication device 700 that supports multi-beam generation in accordance with aspects of the present disclosure. The device 700 may be an example of, or include the components of, the wireless communication device 405, the wireless communication device 505, or a UE 104, 204 or 304, as described herein. The wireless communication device 700 can be, or can include, a chip, system on chip (SoC), chipset, package or device that includes one or more modems 702 (for example, a 3GPP 4G LTE or 5G compliant modem, collectively "the modem 702"). The wireless communication device 700 also includes one or more processors, processing blocks or processing elements 704 (collectively "the processor 704") coupled with the modem 702. In some implementations, the wireless communication device 700 additionally includes one or more radios 706 (collectively "the radio 706") coupled with the modem 702. In some implementations, the wireless communication device 700 further includes one or more memory blocks or elements 708 (collectively "the memory 708") coupled with the processor 704 or the modem 702.

The modem 702 can include an intelligent hardware block or device such as, for example, an application-specific integrated circuit (ASIC), among other possibilities. The modem 702 is generally configured to implement a PHY layer, and in some implementations, also a portion of a MAC layer (for example, a hardware portion of the MAC layer). For example, the modem 702 is configured to modulate packets and to output the modulated packets to the radio 704 for transmission over the wireless medium. The modem 702 is similarly configured to obtain modulated packets received by the radio 704 and to demodulate the packets to provide demodulated packets. In addition to a modulator and a demodulator, the modem 702 may further include digital signal processing (DSP) circuitry, automatic gain control (AGC) circuitry, a coder, a decoder, a multiplexer and a demultiplexer.

The radio 704 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 700 can include, or be coupled with, multiple transmit antennas (each with a corresponding transmit chain) and multiple receive antennas (each with a corresponding receive chain). The symbols output from the modem 702 are provided to the radio 704, which then transmits the symbols via the coupled antennas. Similarly, symbols received via the antennas are obtained by the radio 704, which then provides the symbols to the modem 702.

The processor 706 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 706 processes information received through the radio 704 and the modem 702, and processes information to be output through the modem 702 and the radio 704 for transmission through the wireless medium. For example, the processor 706 may implement a control plane and at least a portion of a MAC layer configured to perform various operations related to the generation, transmission, reception and processing of frames or packets. In some implementations, the MAC layer is configured to generate information blocks for provision to the PHY layer for coding, and to receive decoded information bits from the PHY layer for processing. The MAC layer may further be configured to allocate time and frequency resources, for example, for OFDMA, among other operations or techniques. In some implementations, the processor 706 may generally control the modem 702 to cause the modem to perform various operations described above.

The memory 704 can include tangible storage media such as random-access memory (RAM) or read-only memory (ROM), or combinations thereof. The memory 704 also can store non-transitory processor- or computer-executable software (SW) code containing instructions that, when executed by the processor 706, cause the processor to perform various operations described herein for wireless communication, including the generation, transmission, reception and interpretation of frames or packets. For example, various functions of components disclosed herein, or various blocks or steps of a method, operation, process or algorithm disclosed herein, can be implemented as one or more modules of one or more computer programs.

In some examples, the processor 702, the modem 704 and the memory 708 implement, wholly or in part, a communication manager such as the communication manager 415 or the communication manager 515 described with reference to FIGS. 4 and 5, respectively. The communication manager may determine, based on motion of the device 700, a first sampling interval for a set of sampling instances for a wireless channel estimation operation for a multi-beam having a beam pattern with multiple dominant peaks. The communication manager may transmit, to a second wireless communication device (for example, a base station), first control information including an indication of the first sampling interval, an indication of a capability of the device 700 for analog beamforming, and a request for a number of wireless reference signals for the multi-beam.

Figure 8:
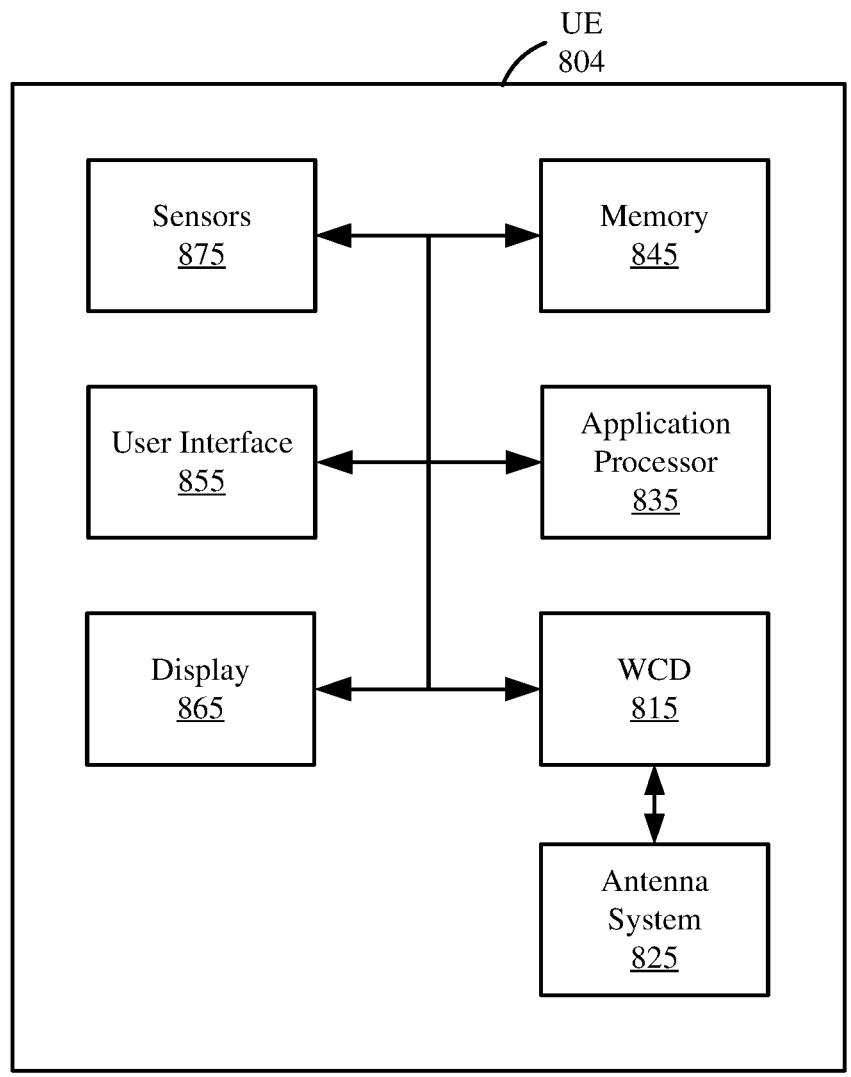
FIG. 8 shows a block diagram of an example user equipment (UE) that supports multi-beam generation in accordance with aspects of the present disclosure.

FIG. 8 shows a block diagram of an example UE 804 that supports multi-beam generation in accordance with aspects of the present disclosure. For example, the UE 804 can be an example implementation of the wireless communication device 405, the wireless communication device 505, or a UE 104, 204 or 304 described with reference to FIGS. 1-5. The UE 804 includes a wireless communication device 815 (although the UE 804 may itself also be referred to generally as a wireless communication device as used herein). For example, the wireless communication device 815 may be an example implementation of the wireless communication device 700 described with reference to FIG. 7. The UE 804 also includes an antenna system 825 including one or more antenna modules and antenna arrays coupled with the wireless communication device 815 to transmit and receive wireless communications. The UE 804 additionally includes an application processor 835 coupled with the wireless communication device 815, and a memory 845 coupled with the application processor 835. In some implementations, the STA 804 further includes a user interface (UI) 855 (such as a touchscreen or keypad) and a display 865, which may be integrated with the UI 855 to form a touchscreen display. In some implementations, the UE 804 may further include one or more sensors 875 such as, for example, one or more inertial sensors, accelerometers, temperature sensors, pressure sensors, or altitude sensors. Ones of the aforementioned components can communicate with other ones of the components directly or indirectly, over at least one bus. The UE 804 further includes a housing that encompasses the wireless communication device 815, the application processor 835, the memory 845, and at least portions of the antenna system 825, UI 855, and display 865.

Figure 9:
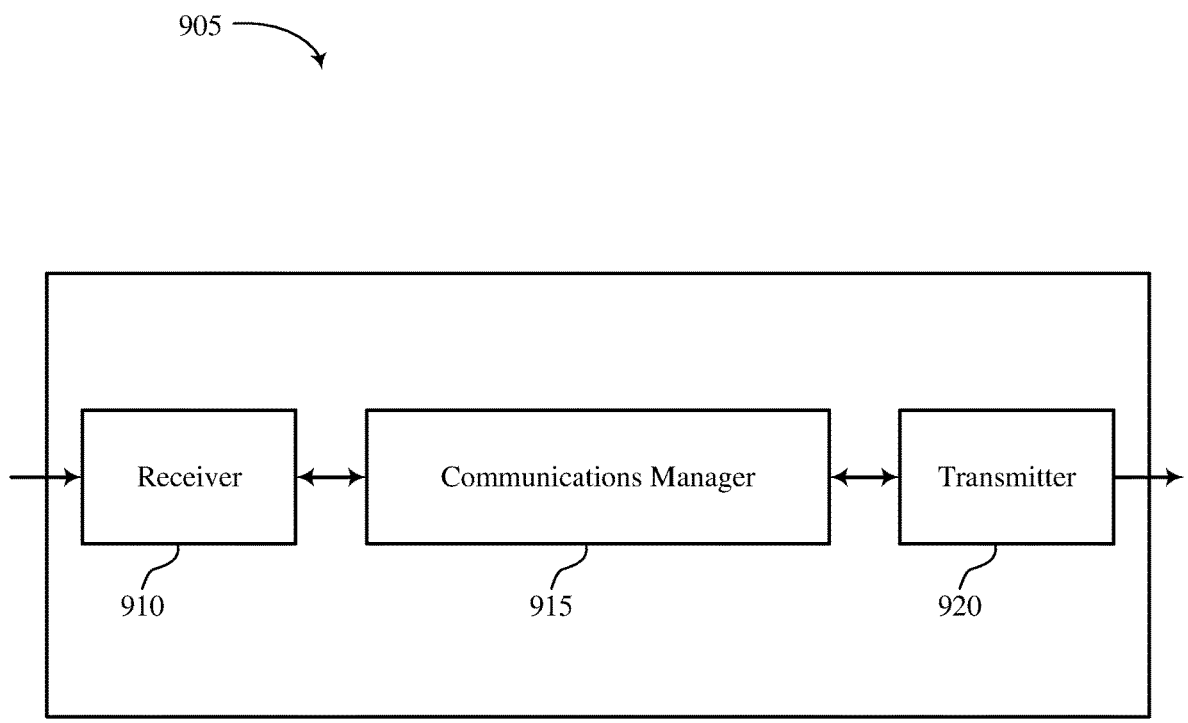
FIG. 9 shows a block diagram of a wireless communication device that supports multi-beam generation in accordance with aspects of the present disclosure.

FIG. 9 shows a block diagram of a wireless communication device 905 that supports multi-beam generation in accordance with aspects of the present disclosure. The wireless communication device may be an example of aspects of a base station 102, 202 or 302 described with reference to FIGS. 1-3, respectively. The wireless communication device 905 includes a receiver 910, a communication manager 915, and a transmitter 920, which may be in communication with one another (for example, via one or more buses). In some examples, the wireless communication device 905 is configured to perform operations including operations of the process 1400 described below with reference to FIG. 14. In some examples, the wireless communication device 905 can include a chip, SoC, chipset, package or device that includes at least one processor and at least one modem (for example, a 5G modem or other cellular modem). In some examples, the communication manager 915, or its sub-components, may be separate and distinct components. In some examples, at least some components of the communication manager 915 are implemented at least in part as software stored in a memory. For example, portions of one or more of the components of the communication manager 915 can be implemented as non-transitory instructions (or "code") executable by the processor to perform the functions or operations of the respective component.

The receiver 910 may receive reference signals (for example, a sounding reference signal), synchronization signals, control information and data information, such as in the form of packets, via various channels including control channels (for example, a PUCCH) and data channels (for example, a PUSCH). The received information may be passed on to other components of the device 905. The receiver 910 may be an example of aspects of the radio 706 described with reference to FIG. 7. The receiver 910 may be coupled with or otherwise utilize a set of antennas (for example, the set of antennas may be an example of aspects of the antenna system 825 described with reference to FIG. 8).

The transmitter 920 may transmit signals generated by the communication manager 915 or other components of the wireless communication device 905. For example, the transmitter 920 may transmit reference signals (for example, periodically configured CSI-RSs, aperiodically configured CSI-RSs, or multi-beam-specific reference signals), synchronization signals (for example, SSBs), control information and data information, such as in the form of packets, generated by the communication manager 915, via various channels including control channels (for example, a PDCCH) and data channels (for example, a PDSCH). In some examples, the transmitter 920 may be collocated with the receiver 910 in a transceiver. The transmitter 920 may be an example of aspects of the radio 706 described with reference to FIG. 7. The transmitter 920 may be coupled with or otherwise utilize a set of antennas (for example, the set of antennas may be an example of aspects of the antenna system 825 described with reference to FIG. 8), which may be antenna elements shared with the receiver 910.

The communication manager 915 may receive, from a second wireless communication device (for example, a UE such as the UE 304 described with reference to FIG. 3), first control information including an indication of a first sampling interval for a channel estimation operation to be performed by the second wireless communication device for a multi-beam to be generated by the second wireless communication device having a beam pattern with multiple dominant peaks. The first control information may further include an indication of a capability of the second wireless communication device for analog beamforming and a request for a number of reference signals for use by the second wireless communication device to form the multi-beam. The communication manager 915 may generate, and cause the transmitter 920 to transmit to the second wireless communication device after the reception of the first control information, second control information including an indication of a second sampling interval for the set of sampling instances. The second sampling interval may be the same as or different than the first sampling interval as described elsewhere herein. The communication manager 915 is further configured to generate and transmit to the UE, via the transmitter 920, reference signals according to the second sampling interval.

In some examples, the communication manager 915 is further configured to perform a beam switch operation to switch from a current single beam having a beam pattern with a single dominant peak to a multi-beam having a beam pattern with multiple dominant peaks such that both the wireless communication device 905 and the second wireless communication device are generating multi-beams. The communication manager 915 may transmit control or data information to, or receive control or data information from, the second wireless communication device via the multi-beam.

Figure 10:
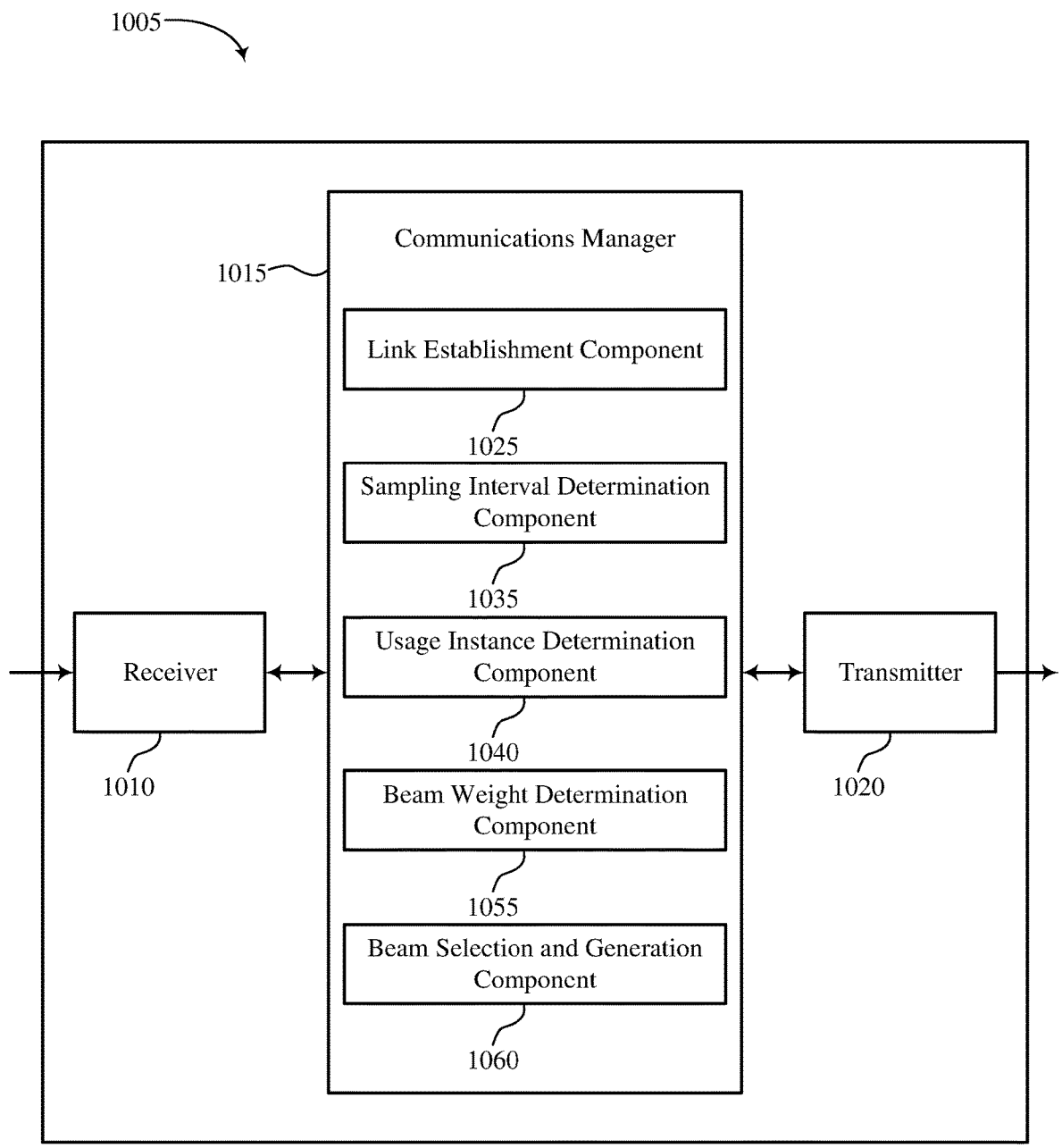
FIG. 10 shows a block diagram of a wireless communication device that supports multi-beam generation in accordance with aspects of the present disclosure.

FIG. 10 shows a block diagram of a wireless communication device 1005 that supports multi-beam generation in accordance with aspects of the present disclosure. The device 1005 may be an example of aspects of a wireless communication device 905 or a base station 102, 202 or 302 described with reference to FIGS. 1-3 and 9. The wireless communication device 1005 may include a receiver 1010, a communication manager 1015, and a transmitter 1020, which may be in communication with one another (for example, via one or more buses). In some examples, the wireless communication device 1005 is configured to perform operations including operations of the process 1400 described below with reference to FIG. 14. In some examples, the wireless communication device 1005 can include a chip, SoC, chipset, package or device that includes at least one processor and at least one modem (for example, a 5G modem or other cellular modem). In some examples, the communication manager 1015, or its sub-components, may be separate and distinct components. In some examples, at least some components of the communication manager 1015 are implemented at least in part as software stored in a memory. For example, portions of one or more of the components of the communication manager 1015 can be implemented as non-transitory code executable by the processor to perform the functions or operations of the respective component.

The receiver 1010 may receive reference signals (for example, a sounding reference signal), synchronization signals, control information and data information, such as in the form of packets, via various channels including control channels (for example, a PUCCH) and data channels (for example, a PUSCH). The received information may be passed on to other components of the device 1005. The receiver 1010 may be an example of aspects of the radio 706 described with reference to FIG. 7. The receiver 1010 may be coupled with or otherwise utilize a set of antennas (for example, the set of antennas may be an example of aspects of the antenna system 825 described with reference to FIG. 8).

The transmitter 1020 may transmit signals generated by the communication manager 1015 or other components of the wireless communication device 1005. For example, the transmitter 1020 may transmit reference signals (for example, periodically configured CSI-RSs, aperiodically configured CSI-RSs, or multi-beam-specific reference signals), synchronization signals (for example, SSBs), control information and data information, such as in the form of packets, generated by the communication manager 1015, via various channels including control channels (for example, a PDCCH) and data channels (for example, a PDSCH). In some examples, the transmitter 1020 may be collocated with the receiver 1010 in a transceiver. The transmitter 1020 may be an example of aspects of the radio 706 described with reference to FIG. 7. The transmitter 1020 may be coupled with or otherwise utilize a set of antennas (for example, the set of antennas may be an example of aspects of the antenna system 825 described with reference to FIG. 8), which may be antenna elements shared with the receiver 1010.

The communication manager 1015 may be an example of aspects of the communication manager 915 described with reference to FIG. 9. The communication manager 1015 includes a link establishment component 1025, a sampling interval determination component 1035, a usage instance determination component 1040, a beam weight determination component 1055, and a beam selection and generation component 1060.

The link establishment component 1025 is configured to establish a link with the second wireless communication device including the establishment of a BPL as, for example, described with reference to FIG. 3. For example, the link establishment component 1025 may, in conjunction with the beam weight determination component 1055 and the beam selection and generation component 1060, perform a beam training operation with the second wireless communication device to select a single transmit beam. For example, the beam weight determination component 1055 is configured to select or otherwise determine a set of beam weights for each of one or more subsets of antenna elements of the set of antenna elements based on feedback from a channel estimation operation performed by the second wireless communication device. The beam selection and generation component 1060 may then determine and configure a set of beam weights for a single beam based on the selection of the sets of beam weights.

The transmitter 1020 may periodically or aperiodically transmit a set of reference signals (for example, periodically configured CSI-RSs, aperiodically configured CSI-RSs, or multi-beam-specific reference signals) or synchronization signals (for example, SSBs). The receiver 1010 may periodically or aperiodically receive reports (for example, a CSI report) that provide indications of the channel conditions at particular associated times based on measurements performed by the second wireless communication device on the reference signals or synchronization signals. In some examples, the reports may include CQI, a PMI, an RI, various channel measurements, or a combination thereof.

The communication manager 1015 may receive, via the receiver 1010, from the second wireless communication device, first control information including an indication of a first sampling interval $\Delta_{S1}$ for a set of sampling instances for a wireless channel estimation operation to be performed by the second wireless communication device for generating a multi-beam. The first control information may further include an indication of one or more capabilities of the second wireless communication device for analog beamforming and a request for a number of reference signals (for example, a set of CSI-RSs) or synchronization signals (for example, a set of SSBs) for the channel estimation operation. The first control information may be received via the PUCCH.

In some examples, the indication of the capability for analog beamforming includes at least one of an indication of a number of antenna elements of a set of antenna elements of the second wireless communication device, an indication of a number of RF chains of the second wireless communication device coupled with the set of antenna elements, or an indication of a capability to perform both a phase-and-signal-strength-based channel estimate or a signal-strength-only-based channel estimate.

In some examples, the first control information further includes motion information or an indication of a motion state that quantifies or otherwise characterizes the motion of the second wireless communication device. For example, the motion information may include, or the motion state may indicate, one or more motion values or parameters such as a speed or velocity associated with the motion of the wireless communication device or a Doppler value or parameter associated with the motion.

The sampling interval determination component 1035 may determine, based on the first control information, a second sampling interval $\Delta_{S2}$ for the reference signals or synchronization signals. For example, the second sampling interval $\Delta_{S2}$ may indicate a periodicity of the reference signals or synchronization signals (for example, a periodicity of the resources in such signals) to be transmitted by the wireless communication device 1005. The second sampling interval $\Delta_{S2}$ may be the same as or different than the first sampling interval $\Delta_{S1}$ indicated in the first control information. For example, it may be up to the communication manager 1015 whether it will honor the request from the second wireless communication device. In some examples, the first sampling interval $\Delta_{S1}$ indicated in the first control information is a maximum sampling interval tolerable by the second wireless communication device (for examples, tolerable by the second wireless communication device to perform channel estimation of sufficient quality to generate a multi-beam via analog beamforming). In some other examples, the first sampling interval $\Delta_{S1}$ indicated in the first control information is a specific sampling interval requested or suggested by the second wireless communication device.

The sampling interval determination component 1035 may determine the second sampling interval $\Delta_{S2}$ based on a variety of factors or parameters. In some examples in which the first sampling interval $\Delta_{S1}$ is a specific request sampling interval, the sampling interval determination component 1035 may determine to grant the request and to then use the second sampling interval $\Delta_{S2}$ for the periodicity of the reference signals to be transmitted by the wireless communication device 1005. In some examples in which the first sampling interval $\Delta_{S1}$ is a maximum sampling interval, the sampling interval determination component 1035 may honor the request and determine to select a second sampling interval $\Delta_{S2}$ that is less than or equal to the first sampling interval $\Delta_{S1}$. The sampling interval determination component 1035 may, alternatively, determine not to grant the request and to use a second sampling interval $\Delta_{S2}$ that exceeds the first sampling interval $\Delta_{S1}$.

In some examples, the sampling interval determination component 1035 may select a value for the second sampling interval $\Delta_{S2}$ from a set of preconfigured values. In some examples, the sampling interval determination component 1035 may determine the second sampling interval $\Delta_{S2}$ based on motion information indicated in the first control information, for example, a speed or a velocity of the motion of the second wireless communication device or a motion state of the second wireless communication device. Additionally or alternatively, in some examples, the sampling interval determination component 1035 may determine the second sampling interval $\Delta_{S2}$ based on QoS parameters, such as a data rate requirement or a latency requirement of the second wireless communication device. In some such examples, the first control information may further include the data rate requirement or the latency requirement of (or other QoS parameters associated with) the second wireless communication device.

The usage instance determination component 1040 may determine a time of a usage instance. For example, the usage instance determination component 1040 may identify a time of a downlink grant or an uplink grant. The usage instance determination component 1040 may transmit (via the transmitter 1020) scheduling information, for example, in DCI, that identifies time and frequency resources for the usage instance, that is, for the downlink or uplink grant during which the second wireless communication device may receive control or data information from, or transmit control or data information to, the wireless communication device 1005 via a multi-beam in accordance with aspects of the present disclosure. The usage instance determination component 1040 may determine a time of a downlink or uplink grant based on a variety of factors. In some examples, the usage instance determination component 1040 may determine a time of the downlink or uplink grant, and the time and frequency resources associated therewith, based on a data rate requirement or a latency requirement of (or based on other QoS parameters associated with) the second wireless communication device.

After receiving the first control information and determining the second sampling interval $\Delta_{S2}$, the communication manager 1015 may generate and transmit, via the transmitter 1020, second control information including an indication of the second sampling interval $\Delta_{S2}$. For example, the transmitter 1020 may transmit the second control information in a PDCCH. The second control information may explicitly or implicitly indicate whether the first sampling interval $\Delta_{S1}$ requested by the UE has been granted. The second control information may further include a downlink or uplink grant of resources for a subsequent data communication.

After transmitting the second control information, the communication manager 1015 may generate and transmit, via the transmitter 1020, to the second wireless communication device via a set of antenna elements, a set of reference signals (for example, periodically configured CSI-RSs, aperiodically configured CSI-RSs, or multi-beam-specific reference signals) or synchronization signals (for example, SSBs) for the channel estimation operation according to the second sampling interval $\Delta_{S2}$. After transmitting the reference signals or synchronization signals, the communication manager 1015 may then transmit control or data information to, or receive control or data information from, the second wireless communication device via respective beams.

In some examples, based on feedback from the second wireless communication device, the communication manager 1015, and specifically the beam selection and generation component 1060, may also determine to switch to a multi-beam having a beam pattern with multiple dominant peaks for subsequent communication with the second wireless communication device (regardless of whether the second wireless communication device is utilizing a multi-beam). In such examples, the beam weight determination component 1055 is configured to select or otherwise determine a set of multi-beam weights for forming the multi-beam.

Figure 11:
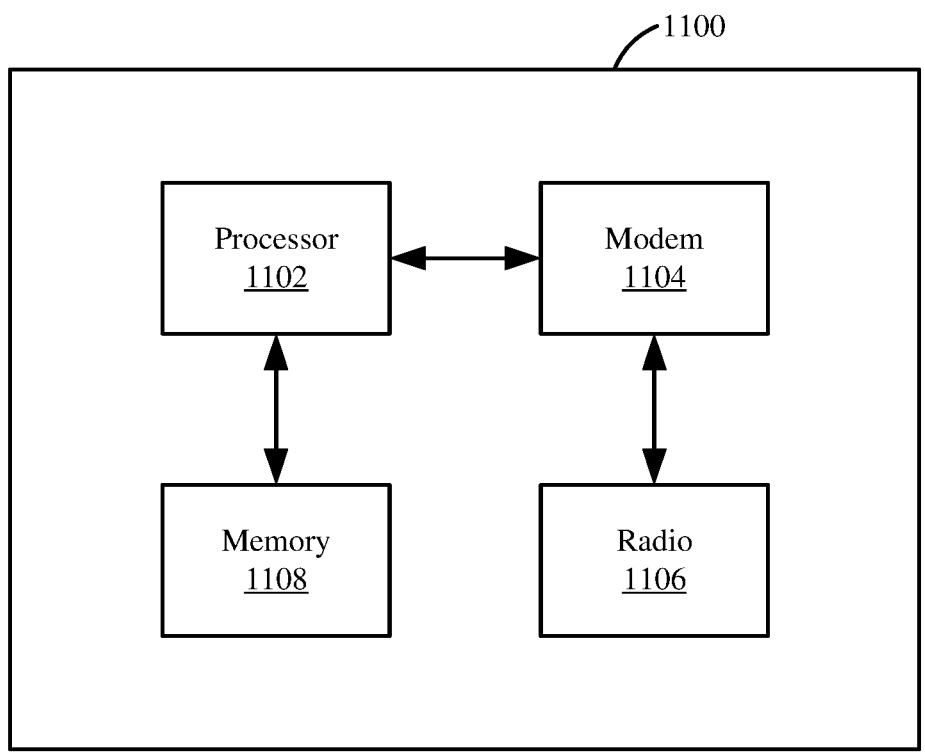
FIG. 11 shows a block diagram of an example wireless communication device that supports multi-beam generation in accordance with aspects of the present disclosure.

FIG. 11 shows a block diagram of an example wireless communication device 1100 that supports multi-beam generation in accordance with aspects of the present disclosure. The device 1100 may be an example of, or include the components of, the wireless communication device 905, the wireless communication device 1005, or a base station 102, 202 or 302, as described herein. The wireless communication device 1100 can be, or can include, a chip, system on chip (SoC), chipset, package or device that includes one or more modems 1102 (for example, a 3GPP 4G LTE or 5G compliant modem, collectively "the modem 1102"). The wireless communication device 1100 also includes one or more processors, processing blocks or processing elements 1104 (collectively "the processor 1104") coupled with the modem 1102. In some implementations, the wireless communication device 1100 additionally includes one or more radios 1106 (collectively "the radio 1106") coupled with the modem 1102. In some implementations, the wireless communication device 1100 further includes one or more memory blocks or elements 1108 (collectively "the memory 1108") coupled with the processor 1104 or the modem 1102.

The modem 1102 can include an intelligent hardware block or device such as, for example, an ASIC, among other possibilities. The modem 1102 is generally configured to implement a PHY layer, and in some implementations, also a portion of a MAC layer (for example, a hardware portion of the MAC layer). For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include DSP circuitry, AGC circuitry, a coder, a decoder, a multiplexer and a demultiplexer.

The radio 1104 generally includes at least one RF transmitter and at least one RF receiver, which may be combined into one or more transceivers. For example, each of the RF transmitters and receivers may include various analog circuitry including at least one PA and at least one LNA, respectively. The RF transmitters and receivers may, in turn, be coupled to one or more antennas. For example, in some implementations, the wireless communication device 1100 can include, or be coupled with, multiple transmit antennas (each with a corresponding transmit chain) and multiple receive antennas (each with a corresponding receive chain). The symbols output from the modem 1102 are provided to the radio 1104, which then transmits the symbols via the coupled antennas. Similarly, symbols received via the antennas are obtained by the radio 1104, which then provides the symbols to the modem 1102.

The processor 1106 can include an intelligent hardware block or device such as, for example, a processing core, a processing block, a CPU, a microprocessor, a microcontroller, a DSP, an ASIC, a PLD such as a FPGA, discrete gate or transistor logic, discrete hardware components, or any combination thereof designed to perform the functions described herein. The processor 1106 processes information received through the radio 1104 and the modem 1102, and processes information to be output through the modem 1102 and the radio 1104 for transmission through the wireless medium. For example, the processor 1106 may implement a control plane and at least a portion of a MAC layer configured to perform various operations related to the generation, transmission, reception and processing of frames or packets. In some implementations, the MAC layer is configured to generate information blocks for provision to the PHY layer for coding, and to receive decoded information bits from the PHY layer for processing. The MAC layer may further be configured to allocate time and frequency resources, for example, for OFDMA, among other operations or techniques. In some implementations, the processor 1106 may generally control the modem 1102 to cause the modem to perform various operations described above.

The memory 1104 can include tangible storage media such as RAM or ROM, or combinations thereof. The memory 1104 also can store non-transitory processor- or computer-executable SW code containing instructions that, when executed by the processor 1106, cause the processor to perform various operations described herein for wireless communication, including the generation, transmission, reception and interpretation of frames or packets. For example, various functions of components disclosed herein, or various blocks or steps of a method, operation, process or algorithm disclosed herein, can be implemented as one or more modules of one or more computer programs.

In some examples, the processor 1102, the modem 1104 and the memory 1108 implement, wholly or in part, a communication manager such as the communication manager 915 or the communication manager 1015 described with reference to FIGS. 9 and 10, respectively. The communication manager may receive, from a second wireless communication device (for example, a UE), first control information including an indication of a first sampling interval for a channel estimation operation to be performed by the second wireless communication device for a multi-beam to be generated by the second wireless communication device having a beam pattern with multiple dominant peaks. The first control information may further include an indication of a capability of the second wireless communication device for analog beamforming and a request for a number of reference signals for use by the second wireless communication device to form the multi-beam. The communication manager may generate and transmit to the second wireless communication device after the reception of the first control information, second control information including an indication of a second sampling interval for the set of sampling instances. The second sampling interval may be the same as or different than the first sampling interval as described elsewhere herein. The communication manager is further configured to generate and transmit to the UE reference signals according to the second sampling interval.

In some examples, the communication manager is further configured to perform a beam switch operation to switch from a current single beam having a beam pattern with a single dominant peak to a multi-beam having a beam pattern with multiple dominant peaks such that both the wireless communication device 1100 and the second wireless communication device are generating multi-beams. The communication manager may transmit control or data information to, or receive control or data information from, the second wireless communication device via the multi-beam.

Figure 12:
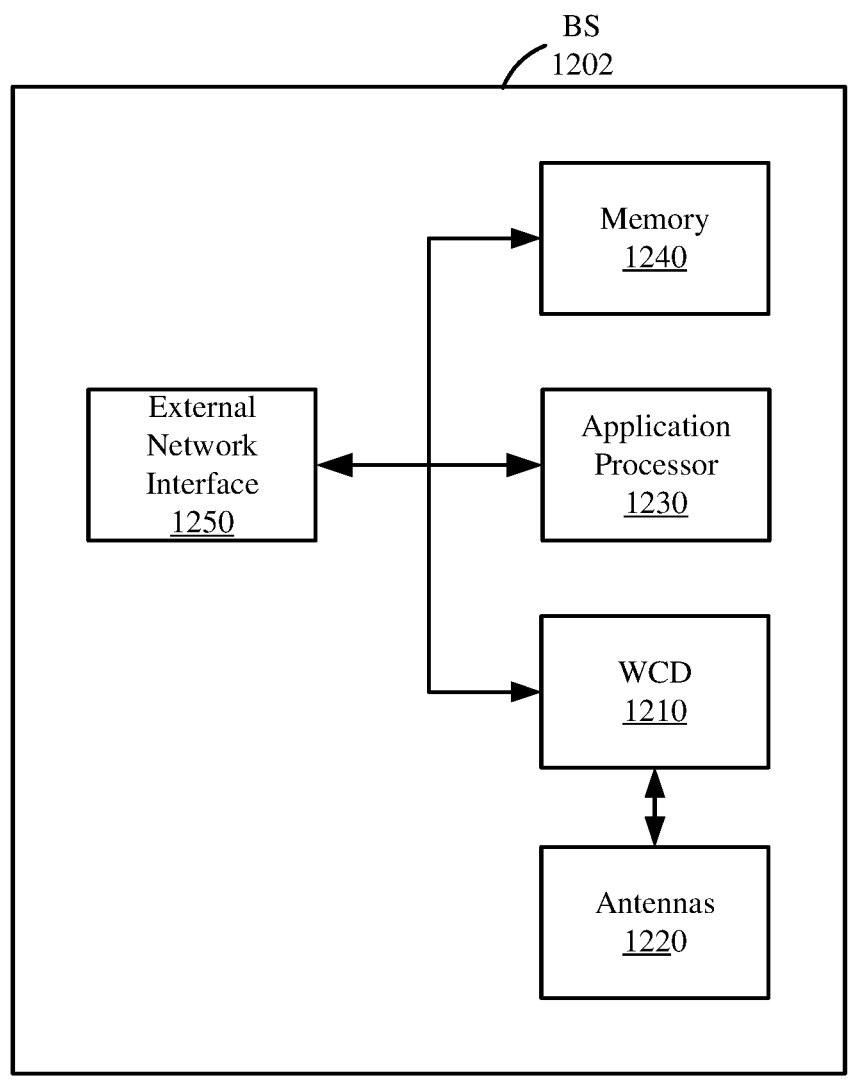
FIG. 12 shows a block diagram of an example base station that supports multi-beam generation in accordance with aspects of the present disclosure.

FIG. 12 shows a block diagram of an example base station 1202 that supports multi-beam generation in accordance with aspects of the present disclosure. For example, the base station 1202 can be an example implementation of the wireless communication device 905, the wireless communication device 1005, or a base station 102, 202 or 302 described with reference to FIGS. 1-5. The base station 1202 includes a wireless communication device 1215 (although the base station 1202 may itself also be referred to generally as a wireless communication device as used herein). For example, the wireless communication device 1215 may be an example implementation of the wireless communication device 1100 described with reference to FIG. 11. The base station 1202 also includes an antenna system 1225 including one or more antenna modules and antenna arrays coupled with the wireless communication device 1215 to transmit and receive wireless communications. The base station 1202 additionally includes an application processor 1235 coupled with the wireless communication device 1215, and a memory 1245 coupled with the application processor 1235. The base station 1202 further includes at least one external network interface 1250 that enables the base station 1202 to communicate with a core network or backhaul network to gain access to external networks including the Internet. For example, the external network interface 1250 may include one or both of a wired network interface and a wireless network interface (such as an IAB interface). Ones of the aforementioned components can communicate with other ones of the components directly or indirectly, over at least one bus.

Figure 13A:
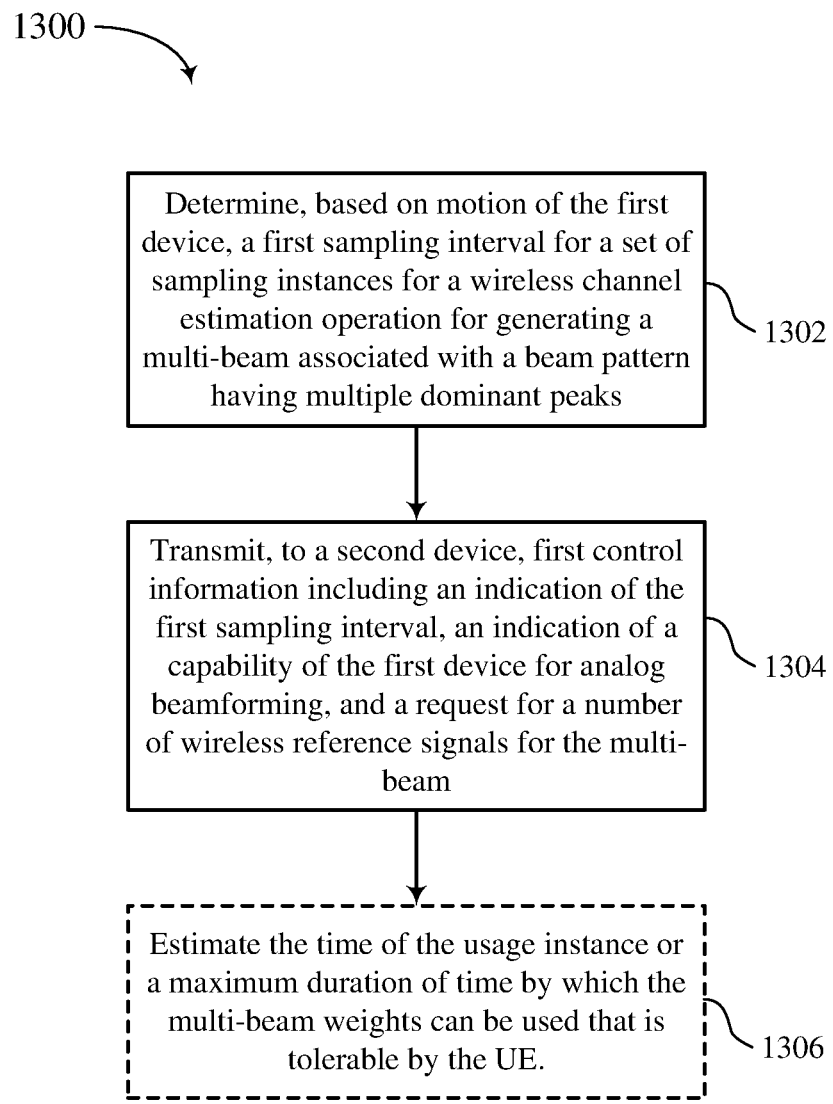
FIGS. 13A and 13B show flowcharts illustrating methods that support multi-beam generation in accordance with aspects of the present disclosure.

FIG. 13A shows a flowchart illustrating a process 1300 that supports multi-beam generation in accordance with aspects of the present disclosure. The operations of the process 1300 may be implemented by a UE 104, 204, 304 or 804, or its components, as described herein. For example, operations of the process 11300 may be performed by a communication manager as described with reference to FIGS. 4-8. In some examples, a UE may execute a set of instructions to control the functional elements of the UE to perform the operations or functions described below. Additionally, or alternatively, a UE may perform aspects of the operations or functions described below using special-purpose hardware.

In block 1302, the UE determines, based on motion of the UE, a first sampling interval for a set of sampling instances for a wireless channel estimation operation for a multi-beam having a beam pattern with multiple dominant peaks. In block 1304, the UE transmits, to a base station, first control information including an indication of the first sampling interval, an indication of a capability of the UE for analog beamforming, and a request for a number of wireless reference signals for the multi-beam. For example, the UE may transmit the first control information to the base station in block 1304 in a PUCCH.

In some examples, the indication of the capability of the UE for analog beamforming includes at least one of a number of antenna elements of a plurality of antenna elements of the first device, a number of RF chains of the UE coupled with the plurality of antenna elements, or an indication of a capability to perform both a phase- and signal-strength-based channel estimate or a signal-strength-only-based channel estimate.

In some examples, the first sampling interval is a maximum sampling interval tolerable by the UE. In some other examples, the first sampling interval is a specific sampling interval requested or suggested by the UE. In such former or latter examples, the first sampling interval may be selected from a set of preconfigured values.

In some examples, the process 1300 further includes determining a speed or velocity associated with the motion of the UE and the determination of the first sampling interval is based on the speed or the velocity. In some such examples, the first control information may further include the speed or the velocity or an indication of a motion state of the UE.

Additionally or alternatively, in some examples, the determination of the first sampling interval in block 1302 is further based on a data rate requirement or a latency requirement (or other QoS parameters) of the UE. In such examples, the first control information transmitted in block 1304 may further include the data rate requirement or the latency requirement (or other QoS parameters) of the UE.

In some examples, the process 1300 may further include, in block 1306, estimating the time of a usage instance of the multi-beam based. For example, the UE may estimate the time of the usage instance based on a data rate requirement or a latency requirement (or other QoS parameters) of the UE. Additionally or alternatively, block 1306 may include estimating a maximum duration of time by which the multi-beam weights can be used that is tolerable by the UE. For example, the UE may select a value for the maximum duration from a set of preconfigured values. In some such examples, the first control information further includes an indication of the maximum duration of time.

Figure 13B:
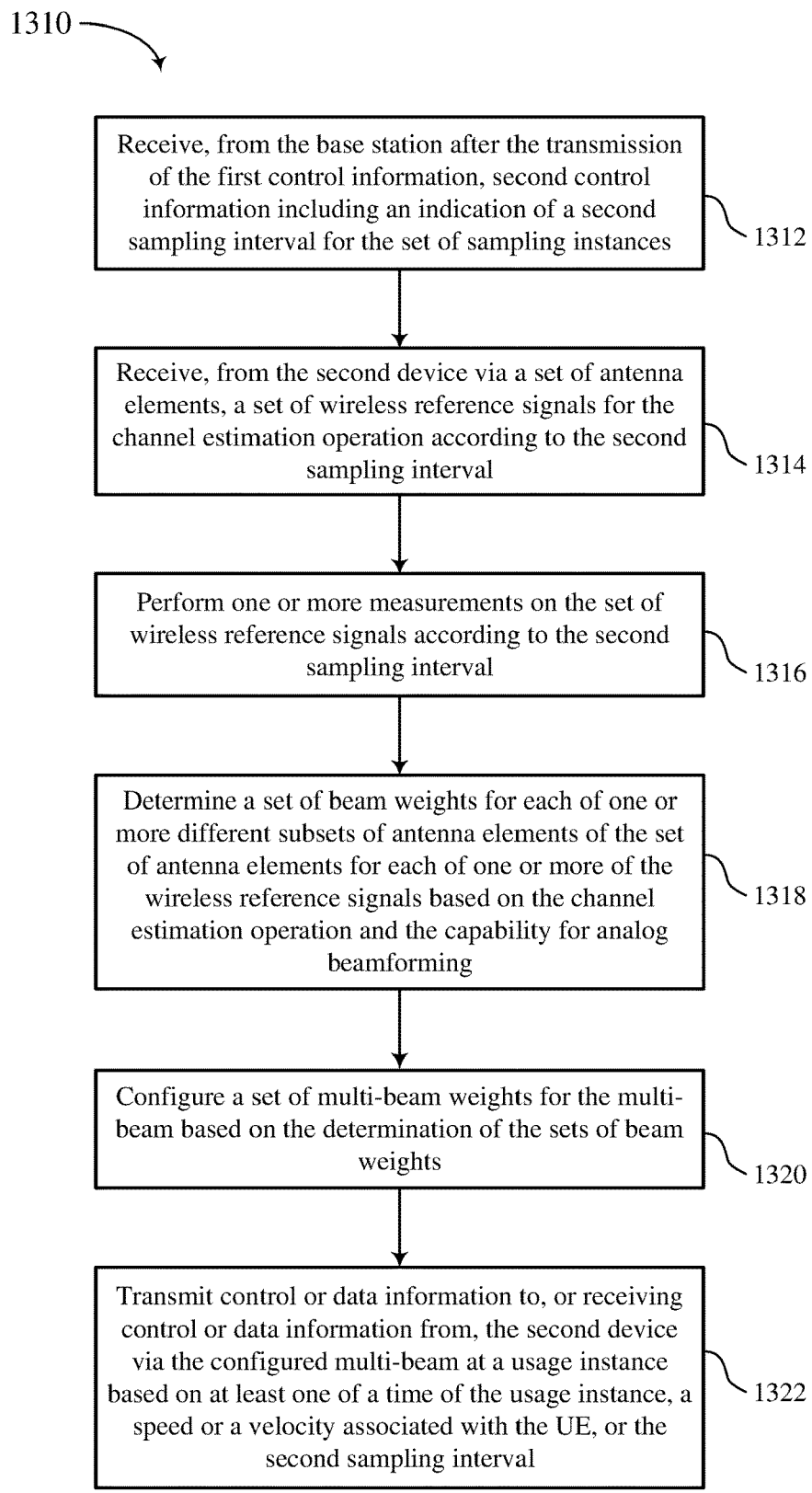

FIG. 13B shows a flowchart illustrating a process 1310 that supports multi-beam generation in accordance with aspects of the present disclosure. The operations of the process 1310 may be implemented by a UE 104, 204, 304 or 804, or its components, as described herein. For example, operations of the process 1310 may be performed by a communication manager as described with reference to FIGS. 4-8. In some examples, a UE may execute a set of instructions to control the functional elements of the UE to perform the operations or functions described below. Additionally, or alternatively, a UE may perform aspects of the operations or functions described below using special-purpose hardware.

In some examples, the process 1310 may continue from, or otherwise follow, the process 1300 described with reference to FIG. 13A. In block 1312, after the transmission of the first control information, the UE receives, from the base station, second control information including an indication of a second sampling interval for the set of sampling instances, which may be the same as or different than the first sampling interval. For example, the UE may receive the second control information in block 1312 in a PDCCH.

After receiving the second control information, the UE receives, in block 1314, from the base station via a set of its antenna elements, a set of reference signals for the channel estimation operation according to the second sampling interval. For example, the reference signals may include wherein the reference signals include at least one of periodically configured channel state information reference signals (CSI-RSs), aperiodically configured CSI-RSs, multi-beam-specific reference signals, or synchronization signal blocks (SSBs).

In block 1316, the UE performs one or more measurements on the set of reference signals obtained via one or more respective antenna elements of the set of antenna elements at each of the sampling instances of the set of sampling instances according to the second sampling interval.

In block 1318, the UE determines a set of beam weights for each of one or more subsets of antenna elements of the set of antenna elements for each of one or more of the reference signals based on the channel estimation operation and the capability for analog beamforming. For example, the UE may perform a channel estimation operation based on the measurements to obtain a channel estimate for the multi-beam and determine the sets of beam weights based on the channel estimate. The UE may then configure, in block 1320, a set of multi-beam weights for the multi-beam based on the determined sets of beam weights obtained in block 1318.

In block 1320, the UE may then transmit control or data information to, or receive control or data information from, the base station via the configured multi-beam at an actual usage instance (for example, defined by a downlink or uplink grant received from the base station via DCI or other signaling) based on at least one of a time of the usage instance, a speed or a velocity associated with the UE, or the second sampling interval. For example, the UE may determine, based on comparing the time of the usage instance to a threshold, whether the set of beam weights configured for the multi-beam will still be relevant or otherwise suitable for use at the actual usage instance. Additionally or alternatively, the UE may determine, based on comparing the speed or velocity to a threshold, whether the set of beam weights configured for the multi-beam will still be suitable for use at the actual usage instance. Additionally or alternatively, the UE may determine, based on comparing the second sampling interval to a threshold, whether the second sampling interval is sufficiently narrow or short such that the channel estimation operation performed by the UE is of sufficient quality for the set of beam weights configured for the multi-beam to be accurate enough for use at the actual usage instance. In some examples, if the UE determines that one or more of these conditions are satisfied, the UE may then transmit or receive the control or data information via the multi-beam at the usage instance in block 1320. In some examples, if the UE determines that one or more of these conditions are not satisfied, it may determine to switch to or otherwise use a single beam. In such latter examples, the UE may then use the single beam to transmit or receive the control or data information at the usage instance.

Figure 14:
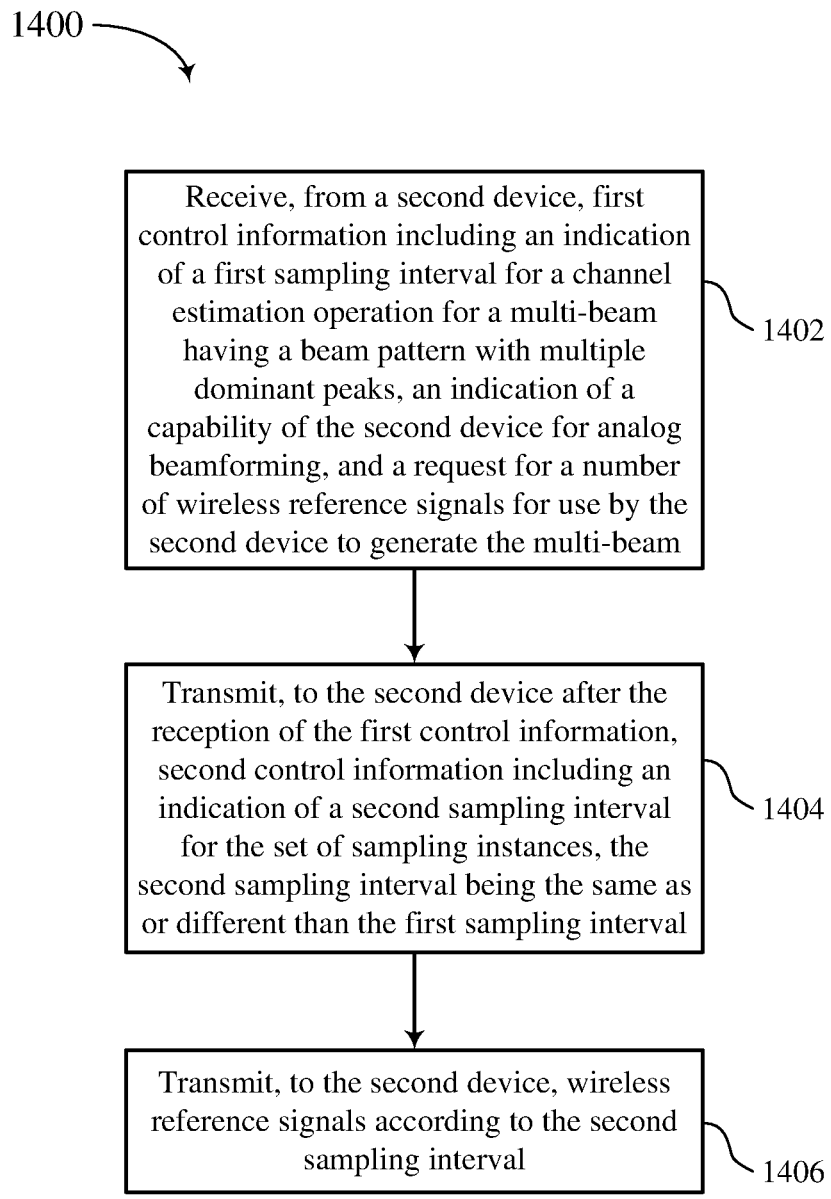
FIG. 14 shows a flowchart illustrating a method that supports multi-beam generation in accordance with aspects of the present disclosure.

FIG. 14 shows a flowchart illustrating a process 1400 that supports multi-beam generation in accordance with aspects of the present disclosure. The operations of the process 1400 may be implemented by a base station 102, 202, 302 or 1202, or its components, as described herein. For example, operations of the process 1400 may be performed by a communication manager as described with reference to FIGS. 9-12. In some examples, a base station may execute a set of instructions to control the functional elements of the base station to perform the operations or functions described below. Additionally, or alternatively, a base station may perform aspects of the operations or functions described below using special-purpose hardware.

In block 1402, the base station receives, from a UE, first control information including an indication of a first sampling interval for a channel estimation operation for a multi-beam having a beam pattern with multiple dominant peaks. The first control information further includes an indication of a capability of the UE for analog beamforming and a request for a number of wireless reference signals for use by the second device to form the multi-beam. For example, the base station may receive the first control information from the UE in block 1402 in a PUCCH.

After the reception of the first control information, the base station transmits, in block 1404, to the UE, second control information including an indication of a second sampling interval for the set of sampling instances. For example, the base station may transmit the second control information to the UE in block 1404 in a PDCCH. In various examples, the second sampling interval may be the same as or different than the first sampling interval.

In block 1406, the base station may then transmits reference signals to the UE according to the second sampling interval. For example, the reference signals may include periodically configured CSI-RSs, aperiodically configured CSI-RSs, multi-beam-specific reference signals, or SSBs.

In some examples, the indication of the capability of the UE for analog beamforming includes at least one of a number of antenna elements of a plurality of antenna elements of the UE, a number of RF chains of the UE coupled with the plurality of antenna elements, or an indication of a capability to perform both a phase- and signal-strength-based channel estimate or a signal-strength-only-based channel estimate.

In some examples, the first sampling interval is a maximum sampling interval tolerable by the UE and the base station determines the second sampling interval based on the maximum sampling interval. In some other examples, the first sampling interval is a specific sampling interval requested or suggested by the UE and the base station determines the second sampling interval based on the requested sampling interval.

In some examples, the first control information further includes a data rate requirement or a latency requirement of the UE and the base station determines the second sampling interval based on the data rate requirement or the latency requirement of the second device. Additionally or alternatively, in some examples the first control information further includes an indication of a motion state of the UE and the base station determines the second sampling interval based on the motion state. Additionally or alternatively, in some examples the first control information further includes an indication of a maximum duration of time by which the multi-beam weights can be used that is tolerable by the UE and the base station determines the second sampling interval based on the indication of the maximum duration of time. In some examples, the second sampling interval may be selected from a set of preconfigured values.

In some examples, the base station may also perform a beam switch operation to switch from a current single beam having a beam pattern with a single dominant peak to a multi-beam having a beam pattern with multiple dominant peaks. For example, the base station may configure a set of multi-beam weights for the multi-beam based on feedback from the UE. The base station may then transmit control or data information to, or receive control or data information from, the UE via the multi-beam.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for analog millimeter-wave beamforming at a first wireless communication device, comprising:
   determining, based on motion of the first wireless communication device, a first measurement interval between each of a set of measurement instances for a wireless channel estimation operation for a multi-beam, the multi-beam being associated with a beam pattern having at least two dominant peaks each associated with a primary beam and at least one secondary beam;
   transmitting, to the second wireless communication device, first control information including:
   an indication of the first measurement interval,
   an indication of a capability of the first wireless communication device for analog beamforming, and
   an indication for the second wireless communication device to transmit one or more wireless reference signals for the multi-beam;
   determining a set of beam weights for generating the multi-beam based on the primary beam and the at least one secondary beam and the capability for analog beamforming;
   configuring a set of multi-beam weights for the multi-beam based on one or more of the determined sets of beam weights; and
   transmitting control or data information to, or receiving control or data information from, the second wireless communication device via the multi-beam based on the set of beam weights; and
   wherein the determination of the first measurement interval is further based on a data rate requirement of the first wireless communication device or a latency requirement of the first wireless communication device, or both.

2. The method of claim 1, wherein the indication of the capability of the first wireless communication device for analog beamforming includes at least one of a number of antenna elements of a plurality of antenna elements of the first wireless communication device, a number of radio frequency (RF) chains of the first wireless communication device coupled with the plurality of antenna elements, or an indication of a capability to perform both a phase- and signal-strength-based channel estimate or a signal-strength-only-based channel estimate, or any combination thereof.

3. The method of claim 1, wherein the first measurement interval is a maximum measurement interval tolerable by the first wireless communication device or a specific requested measurement interval.

4. The method of claim 1, wherein the first control information further includes an indication of a data rate requirement of the first wireless communication device or an indication of a latency requirement of the first wireless communication device, or both.

5. The method of claim 1, further comprising determining a speed or velocity associated with the motion of the first wireless communication device, wherein the determination of the first measurement interval is based on the speed or the velocity, and wherein the first control information further includes the speed or the velocity or an indication of a motion state of the first wireless communication device, or a combination thereof.

6. The method of claim 1, wherein the one or more wireless reference signals include at least one of periodically configured channel state information reference signals (CSI-RSs), aperiodically configured CSI-RSs, multi-beam-specific reference signals, or synchronization signal blocks (SSBs).

7. A method for analog millimeter-wave beamforming at a first wireless communication device, comprising:
   determining, based on motion of the first wireless communication device, a first measurement interval between each of a set of measurement instances for a wireless channel estimation operation for a multi-beam, the multi-beam being associated with a beam pattern having at least two dominant peaks;
   transmitting, to a second wireless communication device, first control information including:
   an indication of the first measurement interval,
   an indication of a capability of the first wireless communication device for analog beamforming, and an indication for the second wireless communication device to transmit a plurality of wireless reference signals for the multi-beam;

receiving, from the second wireless communication device after the transmission of the first control information, second control information including an indication of a second measurement interval between each of the set of measurement instances, the second measurement interval being the same as or different than the first measurement interval;

receiving, from the second wireless communication device via a set of antenna elements, a set of wireless reference signals for the channel estimation operation according to the second measurement interval;

performing one or more measurements on the set of wireless reference signals obtained via one or more respective antenna elements of the set of antenna elements at each of the measurement instances of the set of measurement instances according to the second measurement interval;

performing the channel estimation operation based on the measurements to obtain a channel estimate for the multi-beam;

determining a set of beam weights for each of one or more subsets of antenna elements of the set of antenna elements for each of one or more of the set of wireless reference signals based on the channel estimation operation and the capability for analog beamforming;

configuring a set of multi-beam weights for the multi-beam based on one or more of the determined sets of beam weights;

transmitting control or data information to, or receiving control or data information from, the second wireless communication device via the configured multi-beam at a usage instance based on a time of the usage instance, a speed or a velocity associated with the first wireless communication device, or the second measurement interval, or any combination thereof; and estimating the time of the usage instance based on a data rate requirement of the first wireless communication device or a latency requirement of the first wireless communication device, or both.

8. The method of claim 7, further comprising estimating, from a set of preconfigured values, a maximum duration of time by which the multi-beam weights can be used that is tolerable by the first wireless communication device.

9. The method of claim 8, wherein the first control information further includes an indication of the maximum duration of time.

10. The method of claim 7 further comprising:
establishing a link with the second wireless communication device;
performing a beam training operation with the second wireless communication device;
selecting a first single beam from a set of single beams based on the performance of the beam training operation, each of the single beams in the set of single beams having a beam pattern with a single respective dominant peak;
configuring a set of single-beam weights for the first single beam;
receiving, from the second wireless communication device, control information via the first single beam based on the configuration of the set of single-beam weights;
performing at least one measurement based on the control information received via the first single beam; and
determining to switch to the multi-beam based on the performance of the at least one measurement.

11. A method for analog millimeter-wave beamforming at a first wireless communication device, comprising:
receiving, from a second wireless communication device, first control information including:
an indication of a first measurement interval between each of a set of measurement instances for a channel estimation operation for a multi-beam, the multi-beam being associated with a beam pattern having at least two dominant peaks each associated with a primary beam and at least one secondary beam,
an indication of a capability of the second wireless communication device for analog beamforming, and
an indication for the second wireless communication device to transmit a one or more wireless reference signals for use by the second wireless communication device for the multi-beam;
transmitting, to the second wireless communication device after the reception of the first control information, second control information including an indication of a second measurement interval between each of the set of measurement instances, the second measurement interval being the same as or different than the first measurement interval;
transmitting, to the second wireless communication device, one or more wireless reference signals according to the second measurement interval;
determining a set of beam weights for each of one or more subsets of antenna elements of the set of antenna elements for each of one or more of the set of wireless reference signals based on the channel estimation operation and the capability for analog beamforming;
configuring a set of multi-beam weights for the multi-beam based on one or more of the determined sets of beam weights;
transmitting control or data information to, or receiving control or data information from, the second wireless communication device via the configured multi-beam at a usage instance based on a time of the usage instance, a speed or a velocity associated with the first wireless communication device, or the second measurement interval, or any combination thereof; and
estimating the time of the usage instance based on a data rate requirement of the first wireless communication device or a latency requirement of the first wireless communication device, or both.

12. The method of claim 11, wherein the indication of the capability of the second wireless communication device for analog beamforming includes at least one of a number of antenna elements of a plurality of antenna elements of the second wireless communication device, a number of radio frequency (RF) chains of the second wireless communication device coupled with the plurality of antenna elements, or an indication of a capability to perform both a phase- and signal-strength-based channel estimate or a signal-strength-only-based channel estimate, or any combination thereof.

13. The method of claim 11, wherein:
the first measurement interval is a maximum measurement interval tolerable by the second wireless communication device, and wherein the method further includes determining the second measurement interval based on the maximum measurement interval; or
the first measurement interval is a specific requested measurement interval, and wherein the method further includes determining the second measurement interval based on the requested measurement interval.

14. The method of claim 11, wherein the first control information further includes a data rate requirement of the second wireless communication device or a latency requirement of the second wireless communication device, or both, and wherein the method further includes determining the second measurement interval further based on the data rate requirement or the latency requirement of the second wireless communication device, or both.

15. The method of claim 11, wherein the first control information further includes an indication of a motion state of the second wireless communication device, and wherein the method further includes determining the second measurement interval based on the motion state.

16. The method of claim 11, wherein the first control information further includes an indication of a maximum duration of time by which a set of multi-beam weights for the multi-beam can be used that is tolerable by the second wireless communication device, wherein the method further includes determining the second measurement interval based on the indication of the maximum duration of time.

17. The method of claim 11, wherein the transmitted one or more wireless reference signals include at least one of periodically configured channel state information reference signals (CSI-RSs), aperiodically configured CSI-RSs, multi-beam-specific reference signals, or synchronization signal blocks (SSBs).

18. A user equipment (UE), comprising:
at least one processor; and
at least one memory communicatively coupled with the at least one processor and storing processor-readable code that, when executed by the at least one processor, is configured to cause the UE to:
determine, based on motion of the first wireless communication device, a first measurement interval between each of a set of measurement instances for a wireless channel estimation operation for a multi-beam, the multi-beam being associated with a beam pattern having a least two dominant peaks each associated with a primary beam and at least one secondary beam;
transmit, to the second wireless communication device, first control information including:
an indication of the first measurement interval,
an indication of a capability of the first wireless communication device for analog beamforming, and
an indication for the second wireless communication device to transmit one or more wireless reference signals for the multi-beam;
determine a set of beam weights for generating the multi-beam based on the primary beam and the at least one secondary beam and the capability for analog beamforming;
configure a set of multi-beam weights for the multi-beam based on one or more of the determined sets of beam weights; and
transmit control or data information to, or receiving control or data information from, the second wireless communication device via the multi-beam based on the set of beam weights;
wherein the determination of the first measurement interval is further based on a data rate requirement of the UE or a latency requirement of the UE, or both.

19. The UE of claim 18, wherein the first measurement interval is a maximum measurement interval tolerable by the UE or a specific requested measurement interval.

20. The UE of claim 18, wherein the first control information further includes an indication of a data rate requirement of the UE or an indication of a latency requirement of the UE, or both.

21. The UE of claim 18, wherein the code, when executed by the at least one processor, is further configured to determine a speed or velocity associated with the motion of the UE, wherein the determination of the first measurement interval is based on the speed or the velocity, and wherein the first control information further includes the speed or the velocity or an indication of a motion state of the UE, or a combination thereof.

22. A user equipment (UE), comprising:
at least one processor; and
at least one memory communicatively coupled with the at least one processor and storing processor-readable code that, when executed by the at least one processor, is configured to cause the UE to:
determine, based on motion of the UE, a first measurement interval between each of a set of measurement instances for a wireless channel estimation operation for a multi-beam, the multi-beam being associated with a beam pattern having at least two dominant peaks;
transmitting, to a network node, first control information including:
an indication of the first measurement interval,
an indication of a capability of the UE for analog beamforming, and
an indication for the network node to transmit a plurality of wireless reference signals for the multi-beam;
receiving, from the network node after the transmission of the first control information, second control information including an indication of a second measurement interval for the set of measurement instances, the second measurement interval being the same as or different than the first measurement interval;
receiving, from the network node via a set of antenna elements, a set of wireless reference signals for the channel estimation operation according to the second measurement interval;
performing one or more measurements on the set of wireless reference signals obtained via one or more respective antenna elements of the set of antenna elements at each of the measurement instances of the set of measurement instances according to the second measurement interval;
performing the channel estimation operation based on the measurements to obtain a channel estimate for the multi-beam; and
wherein the code, when executed by the at least one processor, is further configured to:
determine a set of beam weights for each of one or more subsets of antenna elements of the set of antenna elements for each of one or more of the set of wireless reference signals based on the channel estimation operation and the capability for analog beamforming;
configure a set of multi-beam weights for the multi-beam based on one or more of the determined sets of beam weights;
transmit control or data information to, or receive control or data information from, the base station via the configured multi-beam at a usage instance based on a time of the usage instance, a speed or a velocity associated with the UE, or the second measurement interval, or any combination thereof; and estimate the time of the usage instance based on a data rate requirement of the first wireless communication device or a latency requirement of the first wireless communication device, or both.

23. The UE of claim 22, wherein the code, when executed by the at least one processor, is further configured to estimate the time of the usage instance based on a data rate requirement of the UE or a latency requirement of the UE, or both.

24. The UE of claim 22, wherein the code, when executed by the at least one processor, is further configured to estimate, from a set of preconfigured values, a maximum duration of time by which the multi-beam weights can be used that is tolerable by the UE, wherein the first control information further includes an indication of the maximum duration of time.

25. A network node, comprising:
   at least one processor; and
   at least one memory communicatively coupled with the at least one processor and storing processor-readable code that, when executed by the at least one processor, is configured to cause the network node to:
   receive, from a second wireless communication device, first control information including:
      an indication of a first measurement interval between each of a set of measurement instances for a channel estimation operation for a multi-beam, the multi-beam being associated with a beam pattern having at least two dominant peaks each associated with a primary beam and at least one secondary beam,
      an indication of a capability of the second wireless communication device for analog beamforming, and
      an indication for the second wireless communication device to transmit one or more wireless reference signals for use by the second wireless communication device for the multi-beam;
   transmit, to the second wireless communication device after the reception of the first control information, second control information including an indication of a second measurement interval between each of the set of measurement instances, the second measurement interval being the same as or different than the first measurement interval;
   transmit, to the second wireless communication device, one or more wireless reference signals according to the second measurement interval;
   determine a set of beam weights for each of one or more subsets of antenna elements of the set of antenna elements for each of one or more of the set of wireless reference signals based on the channel estimation operation and the capability for analog beamforming;
   configure a set of multi-beam weights for the multi-beam based on one or more of the determined sets of beam weights;
   transmit control or data information to, or receiving control or data information from, the second wireless communication device via the configured multi-beam at a usage instance based on a time of the usage instance, a speed or a velocity associated with the first wireless communication device, or the second measurement interval, or any combination thereof; and
   estimate the time of the usage instance based on a data rate requirement of the first wireless communication device or a latency requirement of the first wireless communication device, or both.

* * * * *